US011704814B2

(12) United States Patent
Arar et al.

(10) Patent No.: US 11,704,814 B2
(45) Date of Patent: Jul. 18, 2023

(54) ADAPTIVE EYE TRACKING MACHINE LEARNING MODEL ENGINE

(71) Applicant: NVIDIA Corporation, Santa Clara, CA (US)

(72) Inventors: Nuri Murat Arar, Zurich (CH); Niranjan Avadhanam, Saratoga, CA (US); Hairong Jiang, Campbell, CA (US); Nishant Puri, San Francisco, CA (US); Rajath Shetty, Los Altos, CA (US); Shagan Sah, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 176 days.

(21) Appl. No.: 17/319,891

(22) Filed: May 13, 2021

(65) Prior Publication Data

US 2022/0366568 A1    Nov. 17, 2022

(51) Int. Cl.
*G06T 7/20* (2017.01)
*G06N 3/08* (2023.01)
*G06K 9/00* (2022.01)
*G06V 20/59* (2022.01)
*G06V 40/18* (2022.01)
*G06F 18/211* (2023.01)
*G06F 18/21* (2023.01)

(52) U.S. Cl.
CPC .............. *G06T 7/20* (2013.01); *G06F 18/211* (2023.01); *G06F 18/2178* (2023.01); *G06N 3/08* (2013.01); *G06V 20/59* (2022.01); *G06V 40/18* (2022.01)

(58) Field of Classification Search
CPC .......... G06T 7/20; G06V 20/59; G06V 40/18; G06K 9/6228; G06K 9/6263; G06N 3/08
See application file for complete search history.

(56) References Cited

U.S. PATENT DOCUMENTS

| | | | |
|---|---|---|---|
| 10,885,698 B2 | 1/2021 | Muthler et al. | |
| 2020/0216080 A1* | 7/2020 | Soltanian | A61B 5/01 |
| 2021/0271321 A1* | 9/2021 | Zhou | G06K 9/6256 |

OTHER PUBLICATIONS

Huang et al., "Building a Personalized, Auto-Calibrating Eye Tracker from User Interactions", 2016, In Proceedings of the 2016 CHI Conference on Human Factors in Computing Systems, pp. 5169-5179 (11 Pages) (Year: 2016).*

(Continued)

*Primary Examiner* — David F Dunphy
(74) *Attorney, Agent, or Firm* — Taylor English Duma L.L.P.

(57) ABSTRACT

In various examples, an adaptive eye tracking machine learning model engine ("adaptive-model engine") for an eye tracking system is described. The adaptive-model engine may include an eye tracking or gaze tracking development pipeline ("adaptive-model training pipeline") that supports collecting data, training, optimizing, and deploying an adaptive eye tracking model that is a customized eye tracking model based on a set of features of an identified deployment environment. The adaptive-model engine supports ensembling the adaptive eye tracking model that may be trained on gaze vector estimation in surround environments and ensemble based on a plurality of eye tracking variant models and a plurality of facial landmark neural network metrics.

20 Claims, 17 Drawing Sheets

(56) References Cited

OTHER PUBLICATIONS

Fridman, L., Langhans, P., Lee, J., & Reimer, B. (2015). Driver gaze estimation without using eye movement. arXiv preprint arXiv: 1507.04760, 2(4).

Chuang, M. C., Bala, R., Bernal, E. A., Paul, P., & Burry, A. (2014). Estimating gaze direction of vehicle drivers using a smartphone camera. In Proceedings of the IEEE Conference on Computer Vision and Pattern Recognition Workshops.

Naqvi, R., Arsalan, M., Batchuluun, G., Yoon, H., & Park, K. (2018). Deep learning-based gaze detection system for automobile drivers using a NIR camera sensor. Sensors, 18(2), 456.

Vora, S., Rangesh, A., & Trivedi, M. M. (2018). Driver Gaze Zone Estimation using Convolutional Neural Networks: A General Framework and Ablative Analysis. IEEE Transactions on Intelligent Vehicles, 3(3), 254-265.

R. Rodrigues, J. a. Barreto, and U. Nunes, "Camera pose estimation using images of planar mirror reflections," in Proc. European Conf. Computer Vision, 2010, pp. 382-395.

Y. Sugano, Y. Matsushita, and Y. Sato. Learning-by-synthesis for appearance-based 3d gaze estimation. In Computer Vision and Pattern Recognition (CVPR), 2014, pp. 1821-1828.

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

* cited by examiner

600

B602
RECEIVE, AT AN ADAPTIVE-MODEL ENGINE, DEPLOYMENT ENVIRONMENT DATA REPRESENTATIVE OF FEATURES OF A DEPLOYMENT ENVIRONMENT, WHEREIN THE ADAPTIVE-MODEL ENGINE SUPPORTS DERIVING ADAPTIVE EYE TRACKING MODELS CUSTOMIZED TO ONE OR MORE DEPLOYMENT ENVIRONMENTS BASED AT LEAST ON FEATURES OF THE ONE OR MORE DEPLOYMENT ENVIRONMENTS

B604
GENERATE, USING THE ADAPTIVE-MODEL ENGINE, AN ADAPTIVE EYE TRACKING MODEL THAT IS CUSTOMIZED TO THE DEPLOYMENT ENVIRONMENT USING ADAPTIVE-MODEL ENGINE DATA THAT IS IDENTIFIED BASED AT LEAST ON FEATURES OF THE DEPLOYMENT ENVIRONMENT

B606
COMMUNICATE, FROM THE ADAPTIVE-MODEL ENGINE, THE ADAPTIVE EYE TRACKING MODEL

FIGURE 6

ADAPTIVE EYE TRACKING MACHINE LEARNING MODEL ENGINE

BACKGROUND

Recent improvement in eye tracking technology have been developed for desktops, laptops, and tablets (i.e., non-surround or 2-D environments where the user is looking at a small flat surface), as such, conventional eye tracking solutions are limited when applied to surround deployment applications (e.g., driving monitoring systems). This is because the requirements of eye tracking in a vehicle (i.e., in surround or 3-D environments) differ from the requirements of non-surround environments. For example, a driver's expected range of head pose and gaze angles are typically much wider in the natural course of driving compared to a desktop user, and may involve many more surfaces at varying depths from the driver. In addition, eye tracking in a vehicle has to operate robustly under various illumination conditions—good lighting conditions and poor lighting conditions. For example, a vehicle can be operated at different times of the day, with different environment and ambient lighting, and as such, eye tracking has to operate effectively in the full spectrum between sunlight and darkness.

Conventional eye tracking technology, including machine learning techniques, are specifically limited because of the type of data that is collected for training machine learning models and the rigidity of applications of the machine learning models generated from the data. At a high level, eye tracking machine learning models are usually classification models that formulate gaze region detection as a classification problem. In typical implementations, coarse head pose directions and face portions including eyes are identified and used to train a Support Vector Machine ("SVM") gaze classifier. The SVM gaze classifier then outputs one of eight predetermined gaze regions. In another example, facial features are identified and classified in their spatial configuration in six regions. However, classification of a facial feature is often performed without using precise gaze estimation. This spatial configuration-based technique can result in variations in classification accuracy between subjects and within subjects. Moreover, the spatial configuration-based technique does not obtain explicit pupil features, and as such, the accuracy and robustness of understanding pupil movement relative to gaze (and not head movement) can be poor.

In a third conventional approach, Convolutional Neural Networks ("CNN") are trained using facial descriptors to classify gaze regions. However, the validity and accuracy of the gaze classification models according to these approaches are often limited to specific vehicle types with fixed 3-D geometry. As such, a more comprehensive eye tracking system with an alternative basis for performing machine learning operations can improve computing operations and interfaces for eye tracking systems.

SUMMARY

Embodiments of the present disclosure relate to an adaptive eye tracking machine learning model engine ("adaptive-model engine") for an eye tracking system. Systems and methods are disclosed for providing an adaptive-model engine that includes an eye tracking or gaze tracking development pipeline ("adaptive-model training pipeline")—the adaptive-model training pipeline may execute the following training operations: collecting data, training, optimizing, and deploying an adaptive eye tracking model that is customized based on a set of features of an identified deployment environment. The adaptive-model engine may support training the adaptive eye tracking model for gaze vector estimation in surround environments and generating adaptive eye tracking models based on a plurality of eye tracking variant models and a plurality of facial landmark neural network metrics.

In contrast to conventional systems, such as those described above, data may be collected from surround scenes or surround deployment environments for generating an adaptive eye tracking model. For example, surround scene data collection may be based on multiple sensors, multiple perspectives, and data synchronization techniques. Data collection for the adaptive-model engine can include increased data variation (e.g., a set of surround scene data types) for ground truth values including a gaze direction vector and a gaze-direction vector range. The adaptive-model engine supports adaptive-model training of adaptive eye tracking models based on a set of surround scene data types. A set of surround scene data types may represent the different inputs that can be used during adaptive-model training. Adaptive-model training may include several data preparation and processing stages for managing the diversity of a set of surround scene data types that are used for training the adaptive eye tracking model.

In some embodiments, the adaptive-model training of the adaptive-model engine may include techniques for optimizing the adaptive eye tracking model. Iterative improvements can specifically be performed on the adaptive eye tracking model to generate a retrained adaptive eye tracking model. For example, a first adaptive eye tracking model for a vehicle can be generated, and then optimized as a second adaptive eye tracking model based on the type of vehicle, size and geometry of the vehicle, changes in Deep Neural Network ("DNN") model size and preferences, and DNN functionality focus and range.

BRIEF DESCRIPTION OF THE DRAWINGS

The present systems and methods for providing an adaptive eye tracking machine learning model engine are described in detail below with reference to the attached drawing figures, wherein:

FIG. 6 is a flow diagram showing a method for an adaptive model engine to provide an adaptive eye tracking model, in accordance with some embodiments of the present disclosure;

DETAILED DESCRIPTION

Figure 1A:
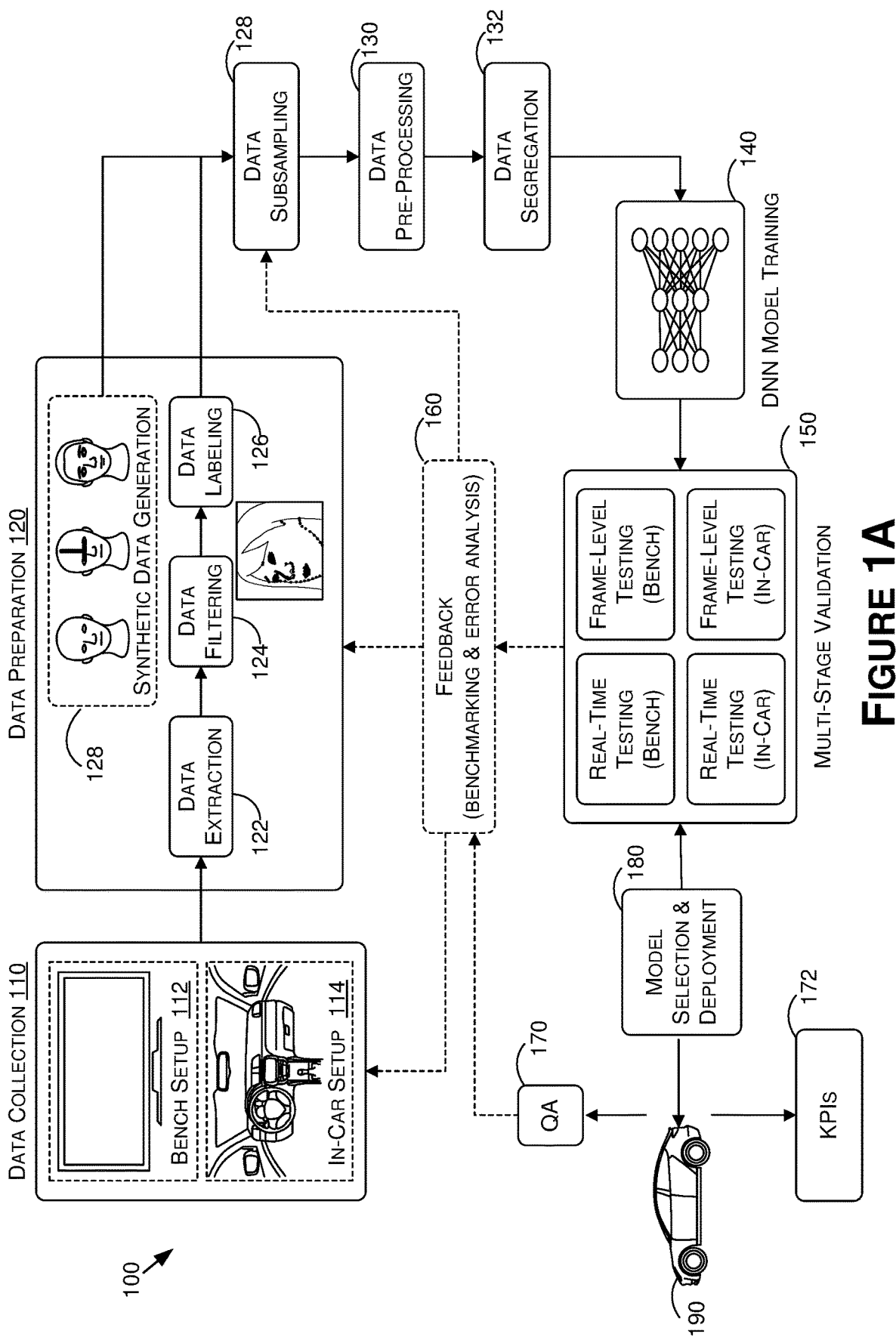
FIG. 1A is an example system for providing an adaptive-model engine, in accordance with some embodiments of the present disclosure.

Systems and methods are disclosed related to an adaptive eye tracking approaches using a machine learning model engine. Although the present disclosure may be described with respect to an example autonomous vehicle 700 (alternatively referred to herein as "vehicle 700" or "ego-vehicle 700," an example of which is described with respect to FIGS. 7A-7D), this is not intended to be limiting. For example, the systems and methods described herein may be used by, without limitation, non-autonomous vehicles, semi-autonomous vehicles (e.g., in one or more Adaptive Driver Assistance Systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving and eye tracking technology, this is not intended to be limiting, and the systems and methods described herein may be used in augmented reality, virtual reality, mixed reality, robotics, security and surveillance, autonomous or semi-autonomous machine applications, and/or any other technology spaces where autonomous driving may be used.

Embodiments of the present disclosure are directed to providing an approach for adaptive eye tracking that uses a machine learning model engine ("adaptive-model engine") for an eye tracking system. The adaptive-model engine may include an eye tracking or gaze tracking development pipeline ("adaptive-model training pipeline") that supports collecting data, training, optimizing, and deploying an adaptive eye tracking model that is customized based on a set of features of an identified deployment environment. The adaptive-model engine supports training the adaptive eye tracking model for gaze vector estimation in surround environments and generating adaptive eye tracking models based on a plurality of eye tracking variant models and a plurality of facial landmark neural network metrics.

According to one or more embodiments, the adaptive-model engine uses surround scene data collection in surround scenes or surround deployment environments to generate adaptive eye tracking models. A surround scene can refer to any multi-dimensional environment (e.g., 2-D or 3-D environment) in which ground truth data is collected to enable the capture of adaptive-model engine data (e.g., a set of adaptive-model engine data) of ground truth values. In contrast to conventional systems with two-dimensional scene data collection, data collection for the adaptive-model engine can include increased data variation (e.g., a set of surround scene data types) for ground truth values including a gaze direction vector and a gaze-direction vector range.

Surround scene data collection may be based on multiple sensors, multiple perspectives, and data synchronization techniques. By collecting data in surround scenes, several advantages can be achieved over traditional eye tracking data collection techniques. These advantages include, without limitation: flexibility in camera placement, rapid acquisition of diverse data including body, head, eye movement of one or more persons, and robust modeling of the surround scene and scene geometry. For example, surround scene data collection can specifically be used for scene and vehicle-geometry data collection in a way that can be used to train the adaptive eye tracking model such that the adaptive eye tracking model is customized into different eye tracking models that can be deployed to different types of vehicles with different vehicle geometries. Surround scene data collection can be based on a bench setup, where participants are presented with target Ground Truth ("GT") gaze points on a screen through a data collection interface. Surround scene data collection can be based on an in-vehicle setup, where the vehicle is divided into several regions and surround scene data is collected using a signaling mechanism (e.g., Light-Emitting Diode ("LED") panels) at the regions.

The adaptive-model engine supports adaptive-model training of adaptive eye tracking models based on a set of surround scene data types. A surround scene data type can refer to a category of data that is retrieved during surround scene data collection in a surround scene. A set of surround scene data types may represent the different inputs that are used during adaptive-model training. An adaptive-model training pipeline according to various embodiments of the present disclosure can include processing a set of surround scene data types corresponding to data retrieved during surround scene data collection based at least on a plurality of sensors and data synchronization operations.

Adaptive-model training may include several data preparation and processing stages for managing the diversity of a set of surround scene data types that are used for training the adaptive eye tracking model. The data preparation stages can include pre-processing, data filtering, ground truth validation, and task-specific subsampling. Training the adaptive eye tracking model using a set of surround scene data types and data preparation and processing stages support adapting the adaptive eye tracking for variations in deployment environments. For example, the adaptive eye tracking model can be trained to, firstly, support different lighting, cameras, and placement data types to support different vehicle eye tracking systems, secondly, support different occupant data types (e.g., facial characteristics, ethnicity, eyewear, headgear, clothing, facial hair, partial occlusions, and body, head, and eye movements), and thirdly, handle errors in ground truth generation and labeling.

Adaptive-model training can be based on an adaptive-model training pipeline according to one or more embodiments, and the ability of Deep Neural Networks ("DNN") to deliver high quality results, especially when there is sufficient data that has been captured for the specific type of problem to be solved using the DNNs. In this way, the adaptive-model engine may support deriving customized adaptive eye tracking models for eye tracking systems in different deployment environments. The customized adaptive eye tracking models can be generated using an adaptive-model engine data—specifically an adaptable eye tracking model. The adaptable eye tracking model can be a maximum variation model. The adaptable eye tracking model can be initially trained on a large pool of data focusing on maximum variation (i.e., a sample made up of extremes. or chosen to ensure a wide variety of input data and features). The adaptable eye tracking model may be pruned (e.g., dropping feature maps with small valued norms) to reduce computational complexity and discard redundant parameters that lead to overfitting. The pruned adaptable eye tracking model can then be retrained or fine-tuned on the data distribution matching a set of feature of deployed environment data (e.g., car-type and camera location/perspective).

The customized adaptive eye tracking models can be generated using adaptive-model engine data including a plurality of eye tracking variant models (e.g., generic head norm, single eye model, head pose constrained) and a plurality of facial landmark neural network metrics (e.g., facial landmarks confidence, head pose, left/right eye appearance quality) as inputs into an adaptive model selection ensemble manager. The customized adaptive eye tracking models support gaze estimation that predicts where a person is looking, given gaze vector estimation data (e.g., face, left eye, right eye, 2-D/3-D landmarks). The gaze estimation can be based on 3-D gaze vector estimation that predicts the gaze vector.

Furthermore, the adaptive-model training of the adaptive-model engine may include techniques for optimizing the adaptive eye tracking model. Iterative improvements can specifically be performed on the adaptive eye tracking model to generate a retrained adaptive eye tracking model. For example, a first adaptive eye tracking model for a vehicle can be generated, and then optimized as a second, adaptive eye tracking model based on the type of vehicle, size and geometry of the vehicle, user specific parameters, changes in DNN model size and preferences, and DNN functionality focus and range. Moreover, more generally, the adaptive eye tracking model can be adapted to different types of application scenarios beyond automotive applications.

Adaptive Eye Tracking Machine Learning Model Engine

With reference to FIG. 1A, FIG. 1A is an example system 100 for an adaptive eye tracking machine learning model engine ("adaptive-model engine"), in accordance with some embodiments of the present disclosure. For example, a system 100 may provide the adaptive-model engine that includes an eye tracking or gaze tracking development pipeline ("adaptive-model training pipeline"). The system 100 further supports three different types of model improvement operations including: adaptive model selection and ensembling operations, training-based improvement operations, and iterative feedback operations. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

System 100 provides components, instructions, and operations for providing the adaptive-model engine that includes the adaptive-model training pipeline. As shown in FIG. 1A—and discussed below—the components, instructions, and operations include the following: data collection 110 including bench setup 112 and in-car setup 114 for data collection operations—data preparation 130 for data extraction 122, data filtering 124, data labeling 126, synthetic data generation 128, data preparation 130 for data subsampling 132, data pre-processing 134, and data segregation 136—DNN model training 140—multi-stage validation 150—feedback 160, Quality Assurance ("QA") 170, Key Performance Indicators ("KPIs") 172, model selection and deployment 180, and deployment environment 190.

Figure 1B:
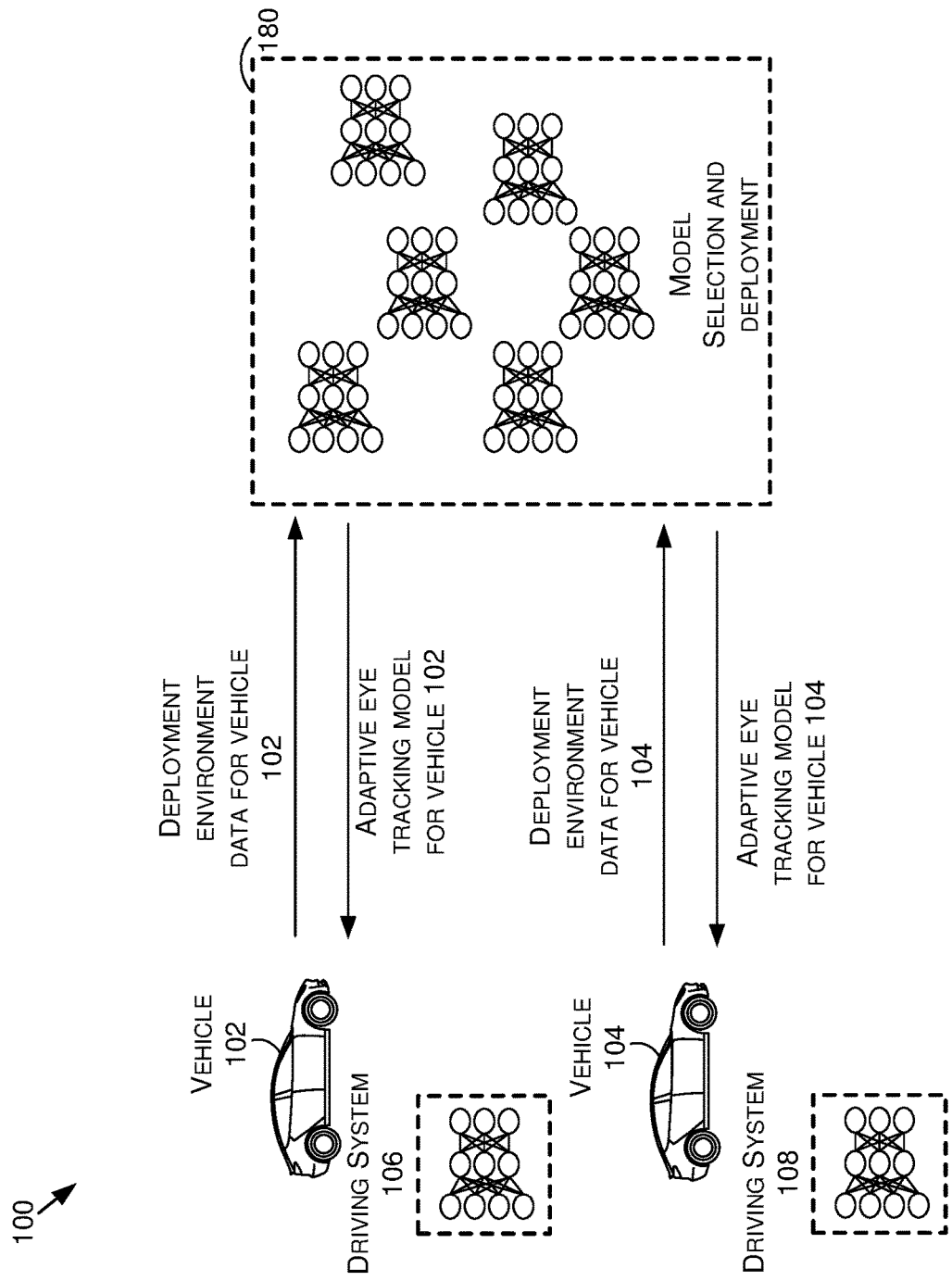
FIG. 1B is an example data flow diagram for a process of providing an adaptive eye tracking model using an adaptive-model engine, in accordance with some embodiments of the present disclosure.

Referring to FIG. 1B, FIG. 1B illustrates an example system 100 for an adaptive eye tracking in accordance with some embodiments of the present disclosure. FIG. 1B includes a vehicle 102 (i.e., first deployment environment having first deployment environment data) and vehicle 104 (i.e., second deployment environment having second deployment environment data). The first deployment environment and second deployment environments can represent different types of vehicles (e.g., vehicle type, size, and geometry). For example, a first vehicle may be a sport utility vehicle ("SUV") and a second vehicle may be a sedan—with each vehicle having different features that are supported by an eye tracking model. Different types of vehicles (e.g., a first vehicle and another vehicle) and non-automotive deployment environments are contemplated with embodiments of the present disclosure.

Vehicle 102 and vehicle 104 may access deployment environment data that corresponds to a set of features of their respective environments and provide the deployment environment data to the system 100 (i.e., adaptive-model engine) of FIG. 1A. The set of features may be used for identifying a corresponding model for the deployment. For example, the set of features may include spatial configuration features (e.g., type, size and geometry of vehicle), DNN-preference configuration features (e.g., DNN model size and performance preferences, DNN functionality focus and range), or gaze type configuration features (e.g., region-based gaze for driver distraction, saccade-based cognitive load estimation, gaze-based human-machine interaction both automotive and non-automotive domains).

The set of features of a deployment environment may further correspond to surround scene data types that refer to a category of data that is retrieved during data collection in a surround scene. A set of surround scene data types may represent the different inputs that are used during model training. In this regard, the set of features may correspond to the types of inputs that are used during model training. For example, the adaptive eye tracking model can be trained to, firstly, support different lighting, cameras, and placement data types to support different vehicle eye tracking systems, secondly, support different occupant data types (e.g., facial characteristics, ethnicity, eyewear, headgear, clothing, facial hair, partial occlusions, and body, head, and eye movements), and thirdly, handle errors in ground truth generation and labeling. As such, the deployment environment data that corresponds to The deployment environment data may comprise data generated by, of, at, or within the deployment environment.

For example, a driving system (e.g., driving system 106 and driving system 108) and/or other components of the vehicle may communicate one or more portions of the deployment environment data to the adaptive-model engine (e.g., an adaptive model selection and ensemble manager). As further examples, one or more computing device(s) 800 may communicate one or more portions of the deployment environment data to the adaptive-model engine. As an example, a computing device(s) 800 may be used in the deployment environment for the purposes of data collection, as described herein, but may not be part of the deployment environment and/or vehicle that is deployed.

The deployment environment data may be generated based on a gaze type for the deployment environment. The deployment environment data generated based on gaze type may be captured by one or more features that the adaptive-model engine uses to generate one or more adaptive eye tracking models for deployment in the deployment environment. The gaze type can include region-based gaze detection for driver distraction, saccade-based cognitive load estimation, gaze-based human-machine interaction both automotive and non-automotive domains. For example, a first vehicle configuration (e.g., a vehicle type, size, and geometry) may be associated with a region-based gaze for driver distraction, while a second vehicle configuration may be associated with gaze-based human-machine interaction. A single vehicle configuration may include a first portion of the vehicle with a first gaze type and a second portion of the vehicle with a second gaze type. As such, the deployment environment data can include gaze type information that can be used for identifying one or more gaze types for a vehicle configuration and a corresponding portion associated with the one or more gaze types. Other variations and combinations of gaze types are contemplated with embodiments of the present disclosure.

In one or more embodiments, the adaptive-model engine can be used to derive adaptive eye tracking models customized to corresponding deployment environments based at least on a set of features of the deployment environments—as discussed herein. In one or more embodiments, the set of features may be indicated to the adaptive-model engine using a database and/or from manually entered or selected settings or configurations. As further examples, the deployment environment data may be provided to the adaptive-model engine using a schema or other indicators of one or more the set of features captured by the deployment environment data. Also, in one or more embodiments, one or more features may be latent within the deployment environment data. Operationally, the vehicle 102 or vehicle 104 may provide the deployment environment data to an adaptive-model engine and receive, from the adaptive-model engine, an adaptive eye tracking model that is customized to the corresponding vehicle's deployment environment. In one example, the adaptive-model engine can be used to derive adaptive eye tracking models of a first vehicle deployment environment, a second vehicle deployment environment, and a third non-vehicle deployment environment each comprising different geometries. According to embodiments, the first vehicle deployment environment may be associated with a first vehicle type, and the second vehicle deployment environment may be associated with a second vehicle type that may be different from the first vehicle type.

In another embodiment, second deployment environment data that corresponds to a set of features of the second deployment environment are accessed and provided the adaptive-model engine to cause generation of a second adaptive eye tracking model. The second adaptive eye tracking model is customized to the second deployment environment using adaptive-model engine data that is identified based at least on the features of the second deployment environment. The second adaptive eye tracking model is provided for deployment in the second deployment environment.

In at least one embodiment, the vehicle 102 or vehicle 104 may provide the deployment environment data by transmitting the data to the adaptive-model engine. However, in other examples, at least some of the deployment environment data may be provided by another device or user within the deployment environment.

Using data that is identified based at least on the set of features of the deployment environment, the adaptive-model engine (e.g., using adaptive model selection and ensemble manager 180) derives a first customized adaptive eye tracking model for vehicle 102 and a second customized adaptive eye tracking model for vehicle 104. The corresponding adaptive eye tracking models may be trained based at least on gaze surround scene data and gaze vector estimation data. A customized adaptive eye tracking model supports gaze estimation that predicts where a person is looking, given gaze vector estimation data (e.g., face, left eye, right eye, 2-D/3-D landmarks). The gaze estimation can be based on 3-D gaze vector estimation that predicts the gaze vector.

The adaptive-model engine data may include a plurality of eye tracking variant models (e.g., generic head norm, single eye model, head pose constrained) and a plurality of facial landmark neural network metrics (e.g., facial landmarks confidence, head pose, left/right eye appearance quality). The plurality of eye tracking variant models and the plurality of facial landmark neural network metrics are selected and collectively packaged or combined as an ensemble (e.g., using ensemble machine learning methods for improved predictive performance) based at least on the deployment environment data to generate the adaptive eye tracking model. For example, the adaptive model selection and ensemble manager may receive a first eye tracking variant model and a first facial landmark neural network model to generate an adaptive eye tracking model. Ensemble methods can refer to meta-algorithms that combine several machine learning techniques into one predictive model in order to decrease variance (e.g., bagging), bias (e.g., boosting), or improve predictions (e.g., stacking).

Ensemble methods can be performed using sequential ensemble methods where the base learners are generated sequentially (e.g. AdaBoost) or parallel ensemble methods where the base learners are generated in parallel (e.g. Random Forest). In one or more embodiments, machine learning ensembling may be based on spatial configuration features, DNN-preference configuration features, or gaze type configuration features. For example, a determination can be made of the specific DNN-preference configuration features, DNN model size and performance preferences, DNN functionality focus and range, such that the selecting and ensembling the account for the DNN-preference configurations features. In this regard, generating adaptive eye tracking models can include selecting a plurality of facial landmark neural network metrics and a plurality of eye tracking variant models. The plurality of eye tracking variant models and the plurality of facial landmark neural network metrics are combined to generate outputs (e.g., via an adaptive eye tracking model) including the following: a gaze vector, a point of regard in a camera space, or both. The outputs align with the DNN model size, performance preferences, and DNN functionality, focus, and range, as identified in deployment environment data.

In some embodiments, the deployment environment data received from vehicle 102 or vehicle 104 includes a gaze angle range associated with the deployment environment. The gaze angle range can be represented using a predetermined gaze angle range metric (e.g., eye level (0°), 25° up or down, eye level (10°) 30°)—with other variations and combination contemplated herein. Algorithms analyze the relationship between head and eyes to determine the gaze angle and corresponding gaze angle range. As such, customizing the adaptive eye tracking model is based at least on identifying adaptive-model engine data for generating the adaptive eye tracking model based at least on the gaze angle range. The adaptive eye tracking model includes a subset of data from adaptive-model engine data.

The vehicle 102 or vehicle 104 (e.g., via driving systems thereof) receive, from the adaptive-model engine (e.g., via adaptive model selection and ensemble manager 180), an adaptive eye tracking model that is customized to the deployment environment using adaptive-model engine data that is identified based at least on the features of the deployment environment. The vehicle 102 or vehicle 104 uses the adaptive eye tracking model for deployment in the deployment environment. The adaptive eye tracking model can be deployed to efficiently identify the type of gaze (e.g., region-based gaze for driver distraction, saccade-based cognitive load estimation, gaze-based human-machine interaction both automotive and non-automotive domains) of the deployment environment.

Figure 2A:
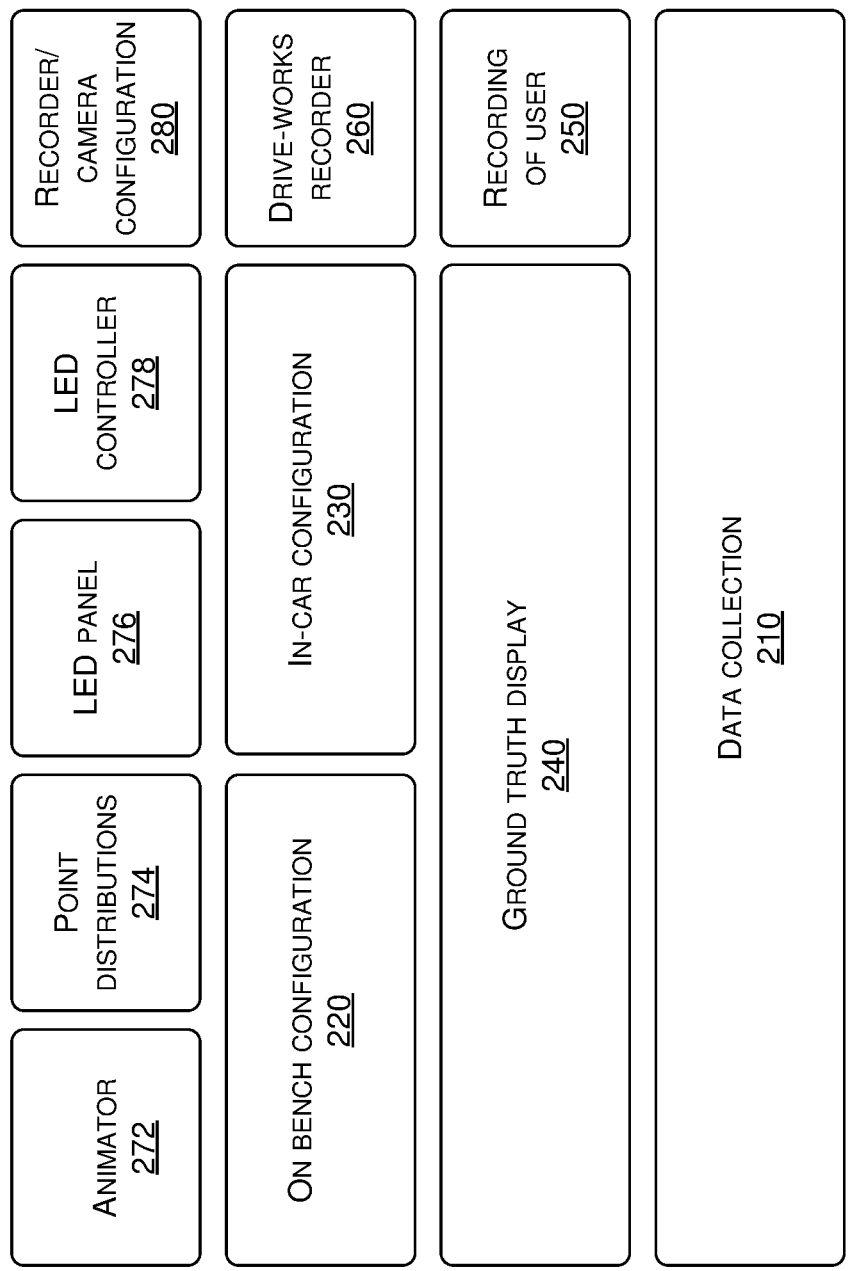
FIGS. 2A-2C include visual representations of example data collection components associated with an adaptive-model engine, in accordance with some embodiments of the present disclosure.
Figure 2B:
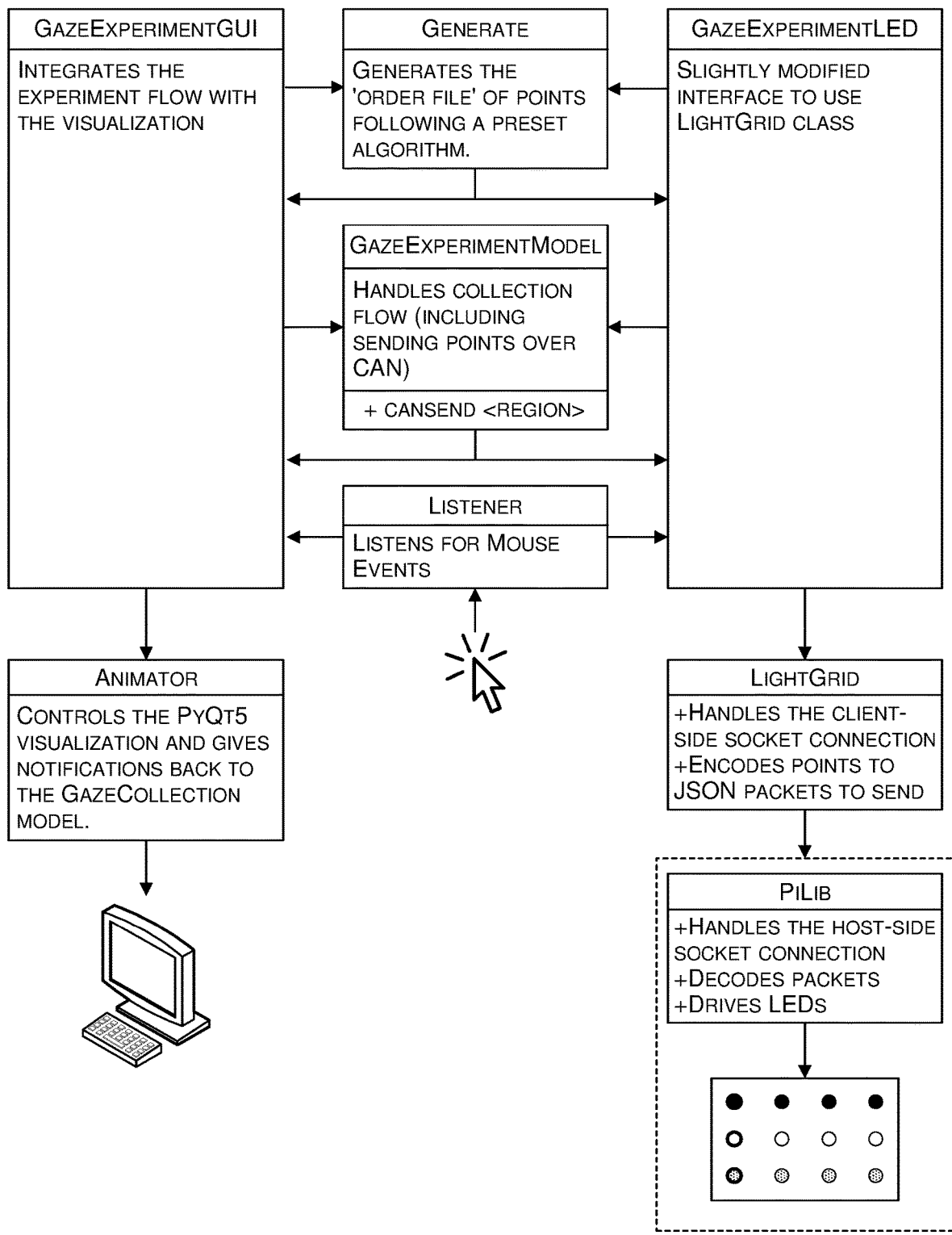
Figure 2C:
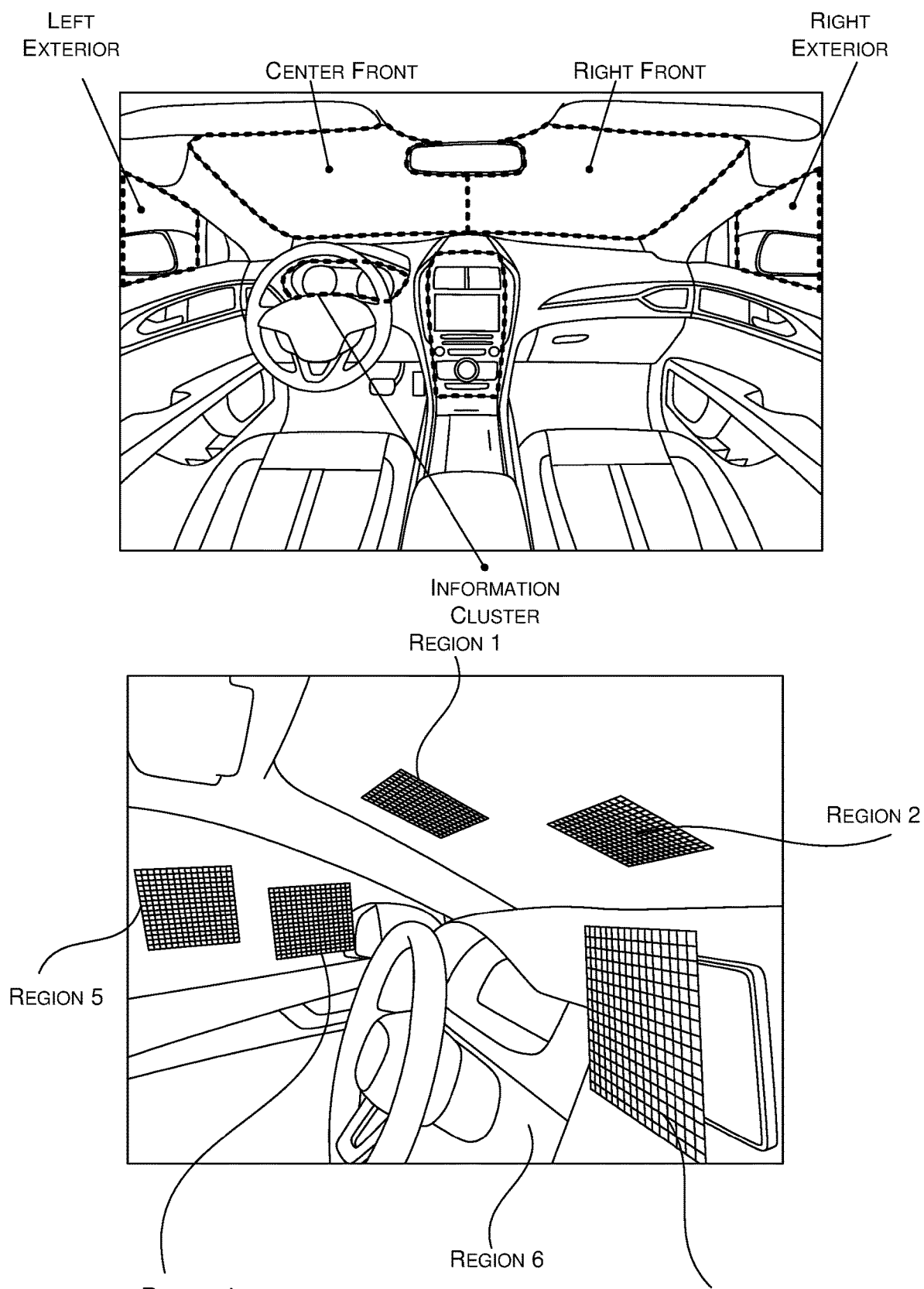

Turning to FIGS. 2A-2C, FIGS. 2A-2C illustrate data collection components, instructions, and operations that support data collection. The data collection components may be used to generate at least some of the deployment environment data described herein. Data collection may be managed by a data collector(s) 210, which may be implemented on any combination of the deployment environment 190 (e.g., a vehicle) and/or a computing device(s) 800. Data collection components may include bench configuration 220, in-car configuration 230, ground truth display 240, recording of user 250, drive-works recorder 260, animator 272, point distributions 274, LED panels 276, LED controller 278, and recorder/camera configuration 280). Where data is generated using the deployment environment 190 and/or a device(s) attached to the deployment environment 190 (e.g., LED panels 276), outputs may be provided to a computing device(s) 800, such as a server, a cloud computing environment, a GPU device, etc.

In one or more embodiments, the computing device(s) 800 may comprise the adaptive model selection and ensemble manager 450C, and/or the computing device(s) 800 may provide (e.g., transmit) at least some of the output data, the deployment environment data, and/or data used to generate the deployment environment data to another device(s), which may include the adaptive model selection and ensemble manager 450C. In one or more embodiments, the data may be provided to a computing device(s) 800 that implements one or more of the DNN model training 140, the feedback 160, the multi-stage validation 150, and/or the data preparation 130.

The data collection operations facilitate gaze data collection to capture large variations of data. The variations of data can include ambient illumination (indoor, outdoor), head movements in 3-D head box, head pose angles, pupil movements, eyewear (glasses, sunglasses, contact lenses), headwear (hats, caps, etc.), occlusion (face masks, drinking from a cup), facial hair (beard, moustache) and makeup, and subject demographics (age, gender, ethnicity, eye type).

Data collection operations can be based on a bench setup (e.g., on bench configuration 220) or an in-car setup (e.g., in-car configuration 230). Advantageously, with both the bench setup and the in-car setup, there can be high throughput and realistic data collection. FIG. 2A includes building blocks that may be used for each of the bench setup and in-car setups. For both setups, a synchronized multi-camera (e.g., 8 cameras) recording (i.e., data synchronization operations) can be used to achieve robustness against camera location and perspective variations. This may provide flexibility in in-car camera placement, a highly desired feature by car manufacturers.

FIG. 2B illustrates a high level architecture of gaze collection instructions and data (e.g., gaze collection software) for data collection. It is contemplated that one or more instructions or data processors may be common to both on-bench and in-car collection, while one or more instructions or data processors may be designed specifically for in-car data collection. For example, Animator, GazeExperimentGUI, Generator, GazeExperimentModel, and Listen are common for on-bench and in-car collection while GazeExperimentLED, LightGrid, and LED controller (PiLib) are designed specifically for in-car data collection. In this regard, processing surround scene data of a set of surround scene data types from the bench setup and the in-vehicle setup is based at least on two or more common data processors, while at least one different data processor of the bench setup and the in-vehicle setup processes surround scene data and executes data synchronization operations exclusively for the bench setup or the in-vehicle setup.

For a bench setup, the participants may be presented with target ground truth ("GT") gaze points on a screen through the data collection app. GT points may be pseudo-randomly generated in order for uniform data distribution on screen. To serve as a visual stimulus, the size of the circular target points may be varied continuously. In addition, to ensure whether a participant is attentive while fixating at target points, an L or R letter may be shown at the center of each circle. The participant is then asked to right- or left-click accordingly with the letter shown to proceed to the next target.

Figure 3:
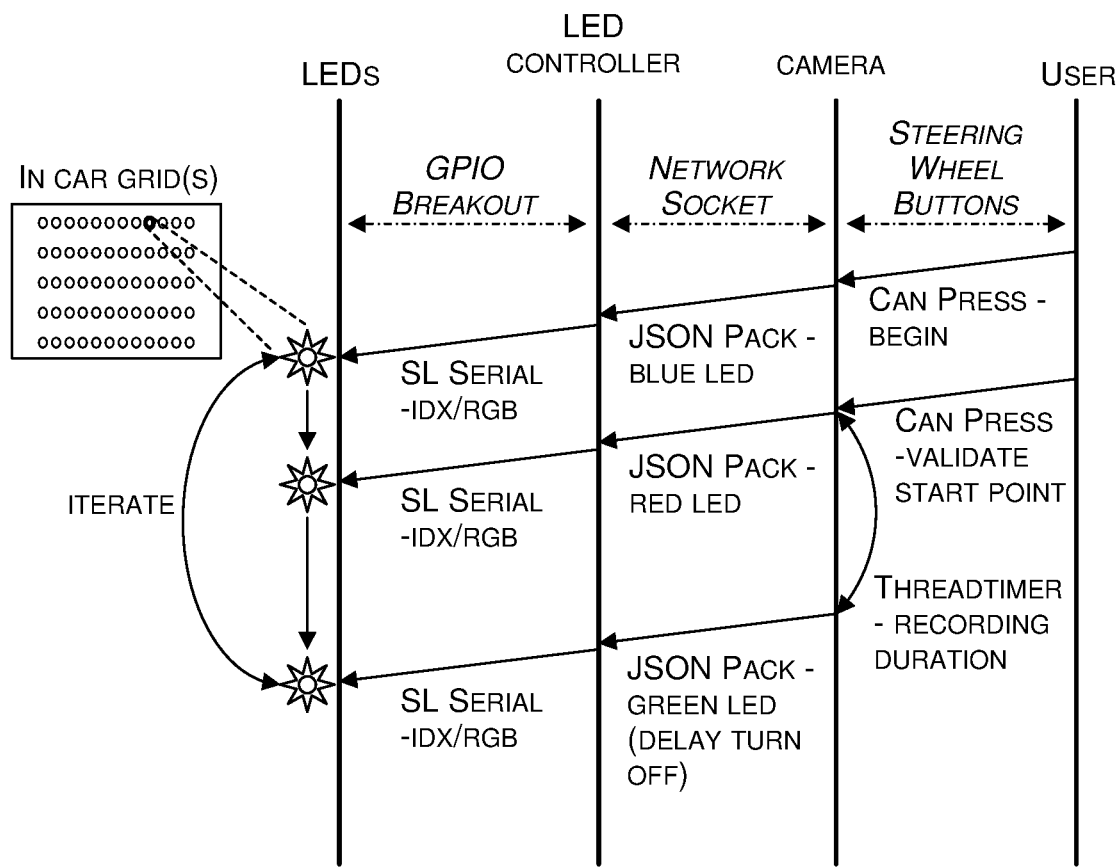
FIG. 3 includes a data flow diagram for a process of in-vehicle data collection for adaptive-model engine, in accordance with some embodiments of the present disclosure.

Turning to FIG. 2C, FIG. 2C illustrates a car or vehicle for an in-car setup or in-vehicle setup. FIG. 2C may be used to describe a gaze definition. The car is divided into seven regions for in-car data collection including: "Center Front", "Right Front", "Information Cluster", "Entertainment Console", "Left Exterior", "Right Exterior", and "Off Road". "Off Road" region is defined as car interior other than the six regions. For in-car setup, LED panels are mounted on each region of the car (e.g., region 1, region 2, region 3, region 4, region 5, and region 6). The position of the LED boards can be configured to change iteratively to cover as many locations as possible over the entire car geometry. As shown in FIG. 3, a configurable series of points are highlighted across LED panels on multiple gaze regions.

FIG. 3 includes illustrates in-car data collection components, instructions, and operations that support in-car data collection. In-car data collection components include in car grids 310, LEDs 230, LED controller 330, camera 340, and user input interface 350. The LED controller 330 can be a breakout board connecting in car grids 310, LEDs 230, LED controller 330, camera 340, and user input interface 350. A selected grid can be triggered to serve as a visual stimulus such that a user gaze data is collected based on the selected grid. As shown, the configuration of the LED board assists in gaze data collection. Each board is placed in a specific region, and individual LEDs are illuminated though the car interface. The user or subject triggers the start and end of the data capture though the steering wheel controls. The steering wheel controls are connected to a network socket and to a GPIO breakout. This ensures that the data is collected when the user is looking at the LED. The steering wheel button actuate beginning, validating, and recording corresponding to JSON pack blue LED, JSON pack red LED, and JSON pack green LED at the network socket, and SL serial IDX/RGB, SL serial IDX/RGB, and SL serial IDX/RGB on the GPIO breakout.

Returning to FIG. 1A, FIG. 1A illustrates data preparation components, instructions, and operations that support data preparation. Data preparation operations include data extraction 122, data filtering 124, data labeling 126, synthetic data generation 128, data subsampling 132, data pre-processing 134, and data segregation 136. Data extraction 122 includes accessing data collection records of raw videos from cameras along with files that stores timestamps (through mouse clicks) and GT gaze values for each target gaze point. These files are parsed to extract frames from raw videos and to assign corresponding GT. Data filtering 124 identifies the most useful frames from those extracted in a way to optimize the data distribution. As the videos are recorded at 30 or 60 Hz, most extracted frames are appearance-wise highly similar, and therefore, redundant for the learning. Also, if used for training these frames would cause extra computational cost for data labeling and for model training. To address this, the data filtering 124 may filter the frames based on appearance-similarity, such as based on variations in head pose angle.

Data labeling (and validation) 126 includes generating a final list of frames that are annotated by human labelers for various attributes to be used in model training, such as face and eye bounding boxes, facial landmarks, eye state (open, half-open, barely-open, close), glare/glint intensity and localization, etc. In addition, to reduce or eliminate human labeling errors the validation step employs a ground truth validation mechanism that checks and verifies the given labels with respect to algorithm-generated expected labels. Those samples highly deviating from expected labels are either discarded or re-sent for another round of manual labeling.

Data subsampling 132 may be employed prior to training in order to generate task-specific models. For example, if the model is to deploy on a specific car type (compact, sedan, SUV, truck, etc.), or is desired to work on a particular head pose or gaze angle range, the data may be subsampled accordingly to feed onto the DNN model training 140. Data segregation 136 supports the DNN model training requirement to split the data into train, test, and validation sets. Data segregation 136 employs user-level data segregation (unique anonymous user id as a key) rather than frame-level to achieve high model generalizability across subjects. This ensures none of the users will be included in more than one of the splits.

Data preparation 130 can also include data pre-processing 134 that support data pre-processing operations including each of the following: glare detection, gaze data normalization, and manual eye-gaze feature extraction. Data pre-processing 134 may include glare detection for removal of glare and corresponding masking. The glare detection may be used by the data preparation 130 to achieve robustness to glare on glasses and other reflective objects prior to training. Model training can leverage this in various ways, such as for glare removal using image processing on input images, and for providing a glare mask as an additional input to the network that is trained (which may similarly be provided to the model once trained).

Data pre-processing 134 may further include gaze data normalization. Gaze data normalization may aim to reduce the degree of freedom in the gaze estimation analysis. Gaze data normalization may use a normalized camera space where the camera axes and the axes of a face or an individual eye are aligned (i.e., aligning axis of the gaze data from a camera to a face or eye in the gaze data from the camera). In such a normalized camera space, DNNs may more accurately learn the appearance variations across aligned images. Normalizing gaze data may include undistorting the original frame (e.g., an undistorted gaze data normalization operation); 3-D head pose estimation through localization of facial landmarks and PnP; 3-D position estimation of eye and face centers; and image warping.

Data pre-processing 134 may further include hand-designed or manual eye-features extraction. For each frame, data pre-processing operations may include extracting hand-crafted features that are correlated with gaze (e.g., 28 features), including eye and pupil outlines, relative position of a pupil with respect to the eyeball, and so on. Along with input images, these features may be provided explicitly so as to help the learning process. In this way, the data pre-processing 134 includes extracting a set of manual-extraction gaze features, the set of manual-extraction gaze features are explicitly tagged for training operations in adaptive-model engine.

Figure 4A:
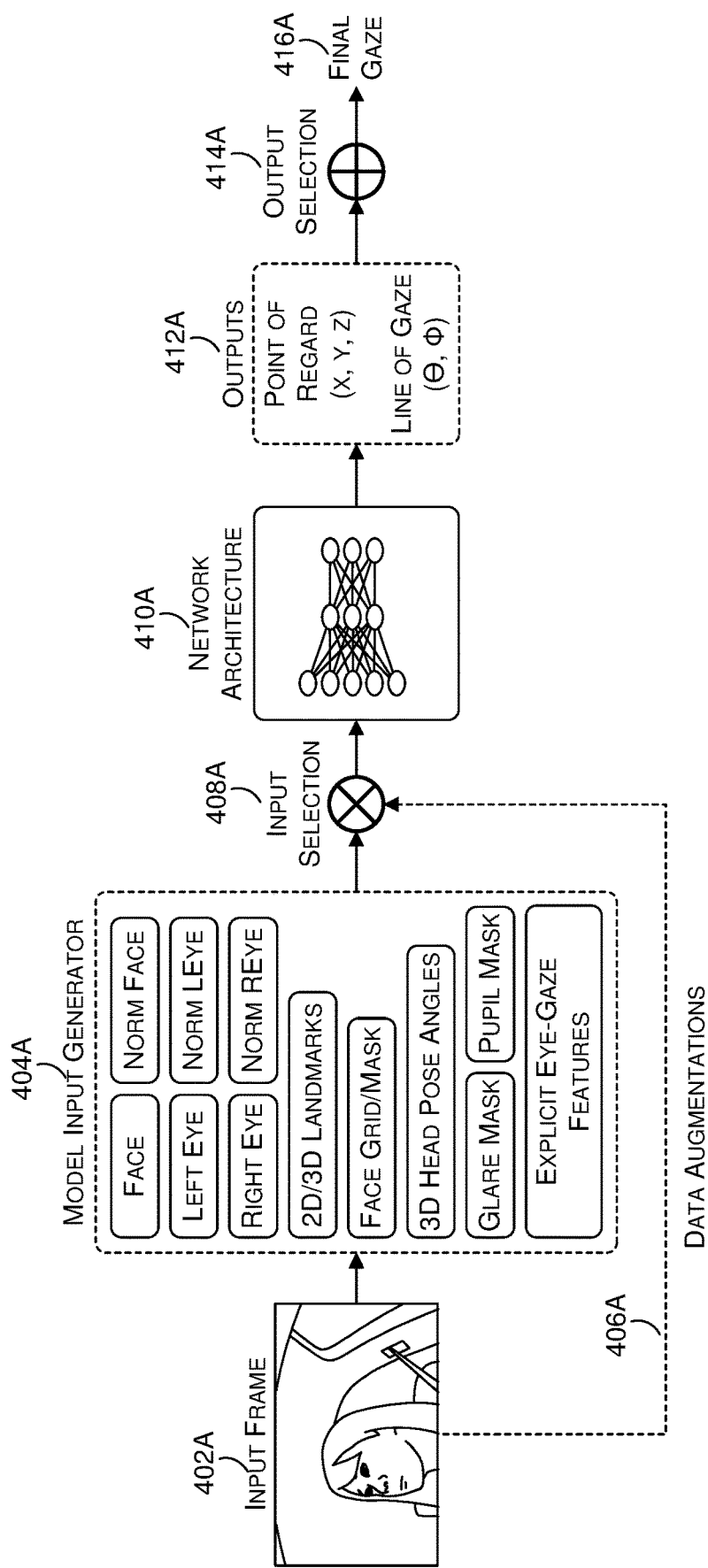
FIGS. 4A-4C are example data flow diagrams for a processes of gaze detection associated with an adaptive-model engine, in accordance with some embodiments of the present disclosure.
Figure 4B:
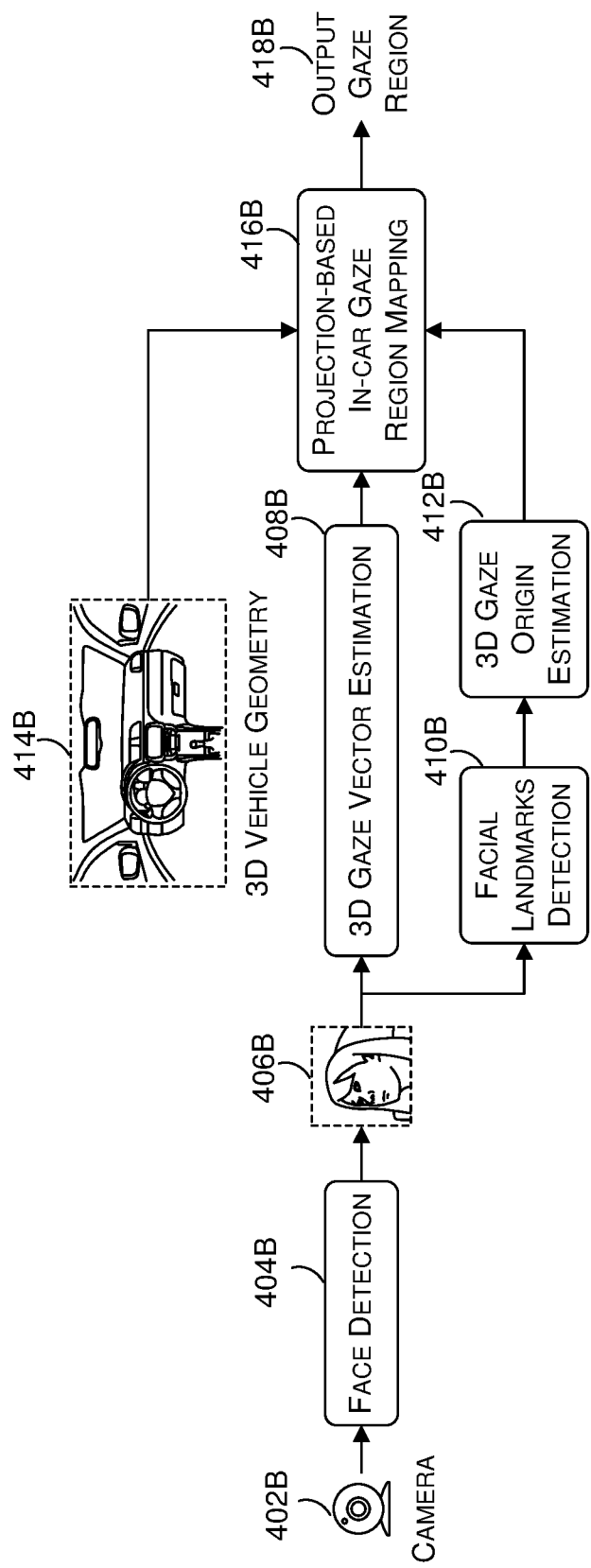

As shown in FIG. 1A, the adaptive-model engine includes DNN model training 140. FIGS. 4A and 4B include examples of DNN model training components, instructions, and operations that support the DNN model training 140. With reference to FIG. 4A, DNN model training components may include input frame 402A, model input generator 404A, data augmentations 406A, input selection 408A, network architecture 410A, outputs 412A, output selection 414A, and final gaze 416A. The DNN model training components define a gaze model training pipeline where the training can be realized. In operation, an input frame (e.g., input frame 402A) can be received and processed through a model input generator (e.g., model input generator 404A). Potential network inputs (e.g., a set of surround scene data types) may include, by way of example and not limitation, Face (original or normalized), Left eye (original or normalized), Right eye (original or normalized), Each eye+channel with glare mask, Each eye+channel with pupil mask, Eyes stripe (rectangular crop over the face covering both eyes), 2-D landmarks, 3-D landmarks, Face mask/grid 3-D head pose angles, and/or hand-crafted eye-gaze features. The input frame is processed by the model input generator 404A to generate an input selection (e.g., input selection 408A) comprising any number or combination of those features for a network architecture (e.g., neural network architecture 410A).

In some embodiments, data augmentations (e.g., data augmentations 406A) are further provided along with the input selection—as discussed in more detail herein. The network architecture processes the input to generate outputs, such as a point of regard and a line of gaze (e.g., outputs 412A) that are processed as output selection (e.g., output selection 414A) to generate a final gaze (e.g., final gaze 416A). It is contemplated that different variations and combinations of model outputs are possible. For example, model outputs may include, by way of example and not limitation, a gaze vector $(\Theta, \phi)$, a point of regard $(x, y, z)$ in camera space, or a combination thereof $(x, y, z, \Theta, \phi)$. The gaze model training pipeline may operate on an end-to-end in-vehicle gaze tracking system, such as that shown in FIG. 4B.

FIG. 4B shows examples of DNN model training components that include a camera 402B, face detection 404B, detected face 406B, 3-D gaze vector estimation 408B, facial landmarks detection 410B, 3-D gaze origin estimation 412B, 3-D vehicle geometry 414B, projection-based in-car gaze region mapping 416, and output gaze region 418B. In operation, a camera (e.g., camera 402B) records content that is processed using face detection operations (e.g., face detection 404B) to identify a detected face (e.g., detected face 406B). The detected face is further processed to identify facial landmarks (e.g., facial landmarks detection 410B) and to determine a 3-D gaze origin estimation (e.g., 3-D gaze origin estimation 412B). The detected face can also be processed to determine a 3-D gaze vector estimation (e.g., 3-D gaze vector estimation 408B).

Operationally, the 3-D gaze vector estimation may be provided to estimate the gaze direction or gaze vector of a user. In some examples, 3-D gaze vector estimation 4108B and 3-D gaze origin estimation 412B determine an output gaze region 418B. The 3-D gaze vector estimation, 3-D gaze vector estimation, and a 3-D vehicle geometry (e.g., 3-D vehicle geometry 414B) may be processed in combination with a projection-based in-car gaze region mapping (e.g., projection-based in-car gaze region mapping 416B) to generate an output gaze region (e.g., output gaze region 418B).

Additional gaze generation operations are contemplated to supplement the above-described operations. In some embodiments, data augmentations (e.g., data augmentations 406A) can be provided for additional robustness in the gaze determination operations. For example, data augmentations can include Gaussian Blur, Gamma adjustment; occluding an eye(s) using shapes (for occlusion invariance); and randomly dropping an eye(s) with some probability. Additional gaze generation operations may also provide support for data filtering for specific tasks and use of loss functions. For example, data may be filtered out based on head pose angles to generate head-pose constrained models and loss functions (e.g., L1, L2, logcosh, cosine). Other variations and combinations of supplemental gaze generation operations are contemplated as being compatible with embodiments of the present disclosure.

Figure 4C:
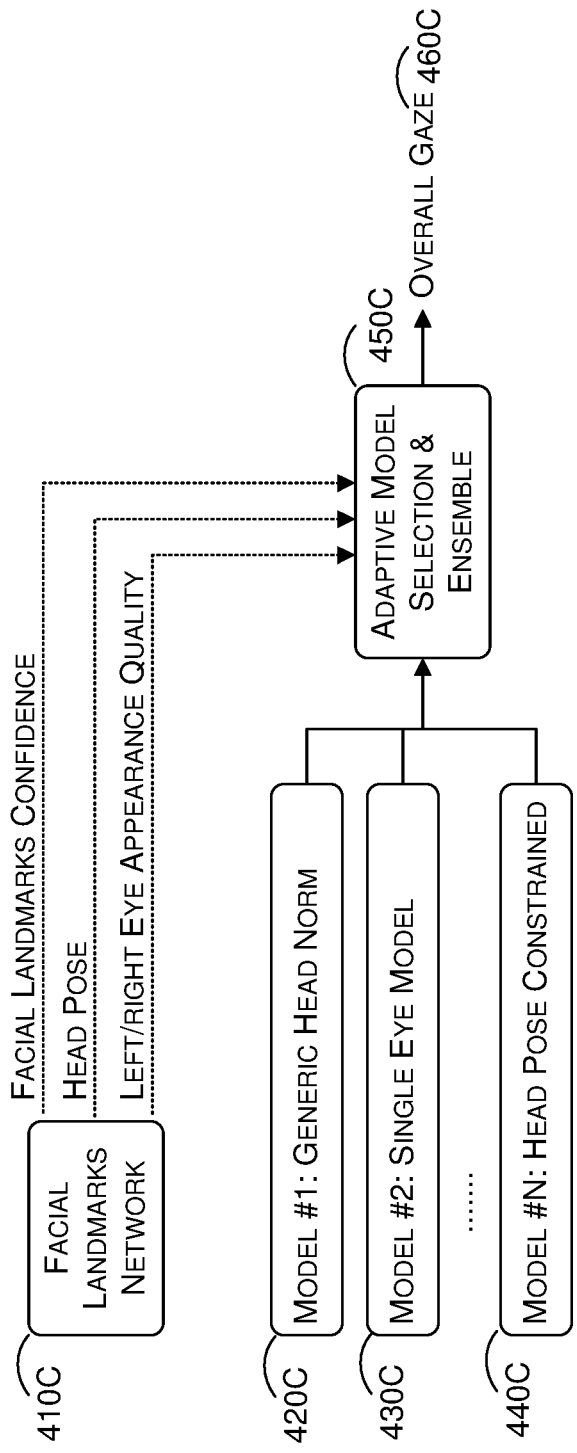

The adaptive-model engine further includes support for different types of model improvement operations examples of which include adaptive model selection and ensembling, training-based improvement, and iterative feedback. With reference to FIG. 4C, FIG. 4C includes a data flow diagram for adaptive model selection and ensembling, which may be used for providing an adaptive eye tracking model, in accordance with embodiments of the present disclosure. FIG. 4C includes adaptive model selection and ensemble components, instructions, and operations that support generating an overall gaze. FIG. 4C includes facial landmarks network 410C, model(s) 420C, model(s) 430C, model(s) 440C, and adaptive model selection and ensemble manager 450C, which selects from the models to generate an adaptive eye tracking model 460C.

In operation, adaptive model selection and ensemble manager 450C is configured to receive inputs (e.g., facial landmarks and variant models) to generate the adaptive eye tracking model 460C that determines (predicts) an overall gaze. As discussed herein, eye tracking models may be trained with various inputs. Model training can include learning complementary information that is leveraged when the eye tracking models are combined. For example, an ensemble of a classical joint model and face normalized Theta-Phi model can be generated by adaptive model selection and ensemble manager 450C.

FIG. 4C shows various examples of variant models (e.g., model #1—generic head norm; model #2 single eye model; through model #N: head pose constrained) that may be ensembled or—more generally—combined. These variant models can be adaptively ensembled or selected based on a set of features of the deployment environment using various possible approaches. As described herein, features the adaptive model selection and ensemble manager 450C may be used to customize the adaptive eye tracking model 460C that may be indicated to the adaptive-model engine using a database and/or from manually entered or selected settings or configurations. For example, the adaptive model selection and ensemble manager may access configuration and/or settings data that corresponds to the deployment environment and indicates the set of features. The settings or configurations may be entered and provided to the adaptive model selection and ensemble manager 450C through a user interface of a Graphical User Interface (GUI) and/or a configuration or settings file.

Additionally or alternatively, the deployment environment data may be provided to the adaptive-model engine using a schema or other indicators of one or more features captured by the deployment environment data. For example, the settings, configurations, schema, and/or other indicators may define or specify one or more characteristics of the deployment environment that the adaptive model selection and ensemble manager 450C may use to select one or more models e.g., (the models 420C, 430C, or 440C) for training, how the models may be trained, how the models may be ensembled, etc. For example, if the characteristics indicate or specify that the deployment environment provides an input(s) (e.g., of a surround scene data type) for one or more of the potential network inputs described with respect to FIG. 4B, but not others, the adaptive model selection and ensemble manager 450C may select and/or collect in an ensemble one or more models that have the input(s) for training. Similarly, if the characteristics indicate or specify that the deployment environment includes a camera that provides a large head pose, the adaptive model selection and ensemble manager 450C may select and/or collect as an ensemble of one or more models that have a single eye model can be used if only one eye is visible.

Also, in one or more embodiments, one or more features may be latent within the deployment environment data. For example, if during training the adaptive model selection and ensemble manager 450C determines the adaptive eye tracking model 460C and/or one or more portions thereof is performing below a threshold level, the adaptive model selection and ensemble manager 450C may automatically reconfigure the adaptive eye tracking model 460C, for example, based at least on one or more other available configuration options. Other available configuration options may include, for example, one or more other models that have inputs corresponding to the deployment environmental data and/or correspond to the one or more characteristics of the deployment environment.

As further example, in one or more embodiments, latent features may be extracted from one or more portions of the deployment environmental data or data otherwise corresponding to the deployment environment, for example, using one or more machine learning models and/or algorithms. In various embodiments, the latest features may be extracted and applied to one or more metrics based at least one an analysis of the data. In one or more embodiments, the adaptive model engine can support (apply) a variety of metrics, such as (for example and without limitation) metrics for relating facial landmarks confidence, head pose, data normalization quality, and/or left/right eye appearance quality. As indicated in FIG. 4C, data for the metrics may be provided by a facial landmarks network 410C, by way of example and not limitation. For a left/right eye appearance quality variant model, it is contemplated that the full variant model can be used if all inputs are available as indicated by the data; however a single eye model can be used if only one eye is visible, for example, due to a large head pose. Operationally, the head pose can be determined such that the corresponding variant model(s) is trained with corresponding head pose constrained data.

Training-based improvement operations may be implemented, for example, using an iterative feedback mechanism that relies on QA 170, KPIs 172, multi-stage validation 150, and feedback benchmarking and error analysis 160 of FIG. 1A to continuously improve DNN models (e.g., identifying and quantifying failure cases). The QA 170 may provide operations for preventing mistakes and defects in models or model variations in order provide confidence that quality requirements are met. KPIs can include set of quantifiable measurements used to gauge a model's long-term performance. KPIs can specifically help determine one model's performance compared to variations of the same model or another different models. Based on QAs and KPIs the training-based improvement may be performed iteratively using a multi-step strategy (e.g., train, prune, and retrain). The strategy can be employed to obtain low-compute networks—that are robust to full gaze angle range—with emphasis on the deployed environment. For example, in at least one embodiment, a variant model is initially trained on a large pool of data focusing on maximum variation. The variant model is pruned—dropping feature maps with small valued norms aggressively—to reduce computational complexity and discard redundant parameters that lead to overfitting. In at least one embodiment, pruning may include— for each new model version that is deployed—extensive benchmarking (e.g., benchmarking versions) and listing out differences over the previous version of the model regarding evaluation metrics (e.g., precise gaze vector error in various data buckets, number of false gaze region detections per N hour of driving). The pruned model is then retrained and fine-tuned on the data distribution matching a deployed environment such as car-type and camera location or camera perspective. In this regard, training-based improvement operations can include receiving feedback data for an adaptive eye tracking model and retraining the adaptive eye tracking model based at least on the multi-stage retraining pipeline of the adaptive-model engine. Upon retraining the adaptive eye tracking model, a retrained adaptive eye tracking model is generated.

Figure 5:
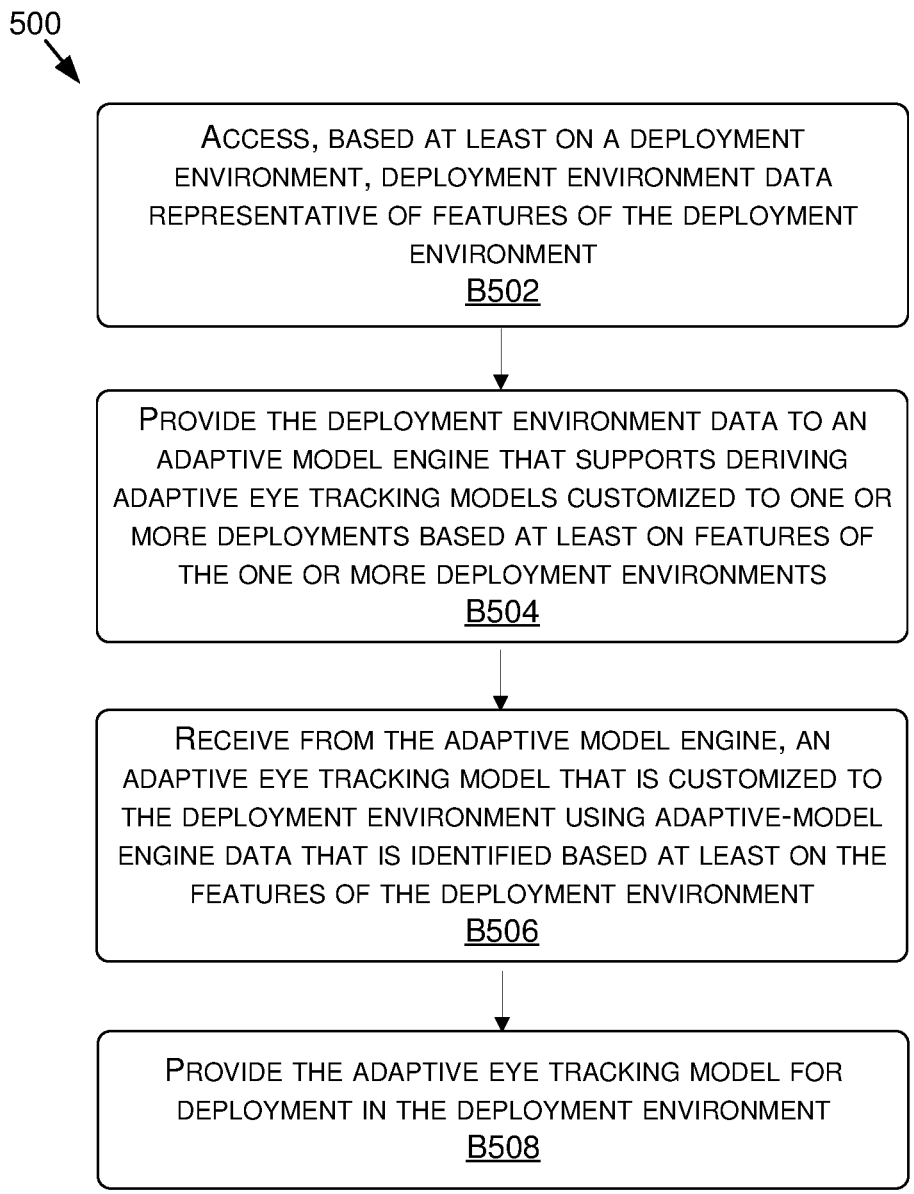
FIG. 5 is a flow diagram showing a method for interacting with an adaptive model engine to provide an adaptive eye tracking model, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 500 is described, by way of example, with respect to the system 100 of FIG. 1. However, these methods may additionally or alternatively be executed by any one system, or any combination of systems, including, but not limited to, those described herein.

FIG. 5 is a flow diagram showing a method 500 for interacting with an adaptive model engine to provide an adaptive eye tracking model, in accordance with some embodiments of the present disclosure. The method 500, at block B502, includes accessing, based at least on a deployment environment (e.g., of the vehicle 102 or 104), deployment environment data corresponding to of the deployment environment. The deployment environment data may include data of features of the deployment environment that correspond to a set of surround scene data types, where a surround scene data type is a category of data retrieved during surround scene data collection.

The method 500, at block B504, includes providing the deployment environment data to an adaptive-model engine that supports deriving adaptive eye tracking models customized to one or more deployment environments based at least on features of the one or more deployment environments. For example, the deployment environment data may be provided to the adaptive model selection and ensemble manager 450C of an adaptive-model engine for the model selection and deployment 180.

The method 500, at block B506, includes receiving, from the adaptive-model engine, the adaptive eye tracking model 460C that is customized to the deployment environment using adaptive-model engine data that is identified based at least on the features of the deployment environment. For example, the adaptive model selection and ensemble manager 450C may select, ensemble, and train one or more of the models 420C, models 430C, and/or 440C and provide the resultant adaptive eye tracking model 460C to one or more devices (e.g., a device that provided the deployment environment data and/or requested generation of the adaptive eye tracking model 460C).

The method 500, at block B508, includes providing the adaptive eye tracking model for deployment in the deployment environment. For example, the device(s) that received the adaptive eye tracking model 460C may provide (e.g., transmit) the adaptive eye tracking model 460C to a device(s) in the deployment environment (e.g., the vehicle 102 or 104).

FIG. 6 is a flow diagram showing a method 600 for an adaptive model engine to provide an adaptive eye tracking model, in accordance with some embodiments of the present disclosure. The method 600, at block B602, includes receiving, at an adaptive-model engine, deployment environment data corresponding to of a deployment environment, the adaptive-model engine supports deriving adaptive eye tracking models customized to one or more deployment environments based at least on features of the one or more deployment environments. For example, the deployment environment data may be received by the adaptive model selection and ensemble manager 450C of the adaptive-model engine for the model selection and deployment 180.

The method 600, at block B604, includes generating, using the adaptive-model engine, an adaptive eye tracking model that is customized to the deployment environment using adaptive-model engine data that is identified based at least on features of the deployment environment, where the adaptive eye tracking model is trained based at least on gaze surround scene data and gaze vector estimation data. For example, the adaptive model selection and ensemble manager 450C may generate the adaptive eye tracking model 460C that is customized to the deployment environment 190.

The method 600, at block B606, includes communicating, from the adaptive-model engine, the adaptive eye tracking model. For example, the adaptive model selection and ensemble manager 450C may provide the resultant adaptive eye tracking model 460C to one or more devices (e.g., a device that provided the deployment environment data and/or requested generation of the adaptive eye tracking model 460C).

It is contemplated that the systems and methods that are disclosed for providing adaptive eye tracking machine learning model engine can be executed using a processor. The processor may include one or more circuits. The processor may be comprised in at least one of: a control system for an autonomous or semi-autonomous machine; a perception system for an autonomous or semi-autonomous machine; a system for performing simulation operations; a system for performing deep learning operations; a system implemented using an edge device; a system implemented using a robot; a system incorporating one or more virtual machines (VMs); a system implemented at least partially in a data center; or a system implemented at least partially using cloud computing resources.

Example Autonomous Vehicle

Figure 7A:
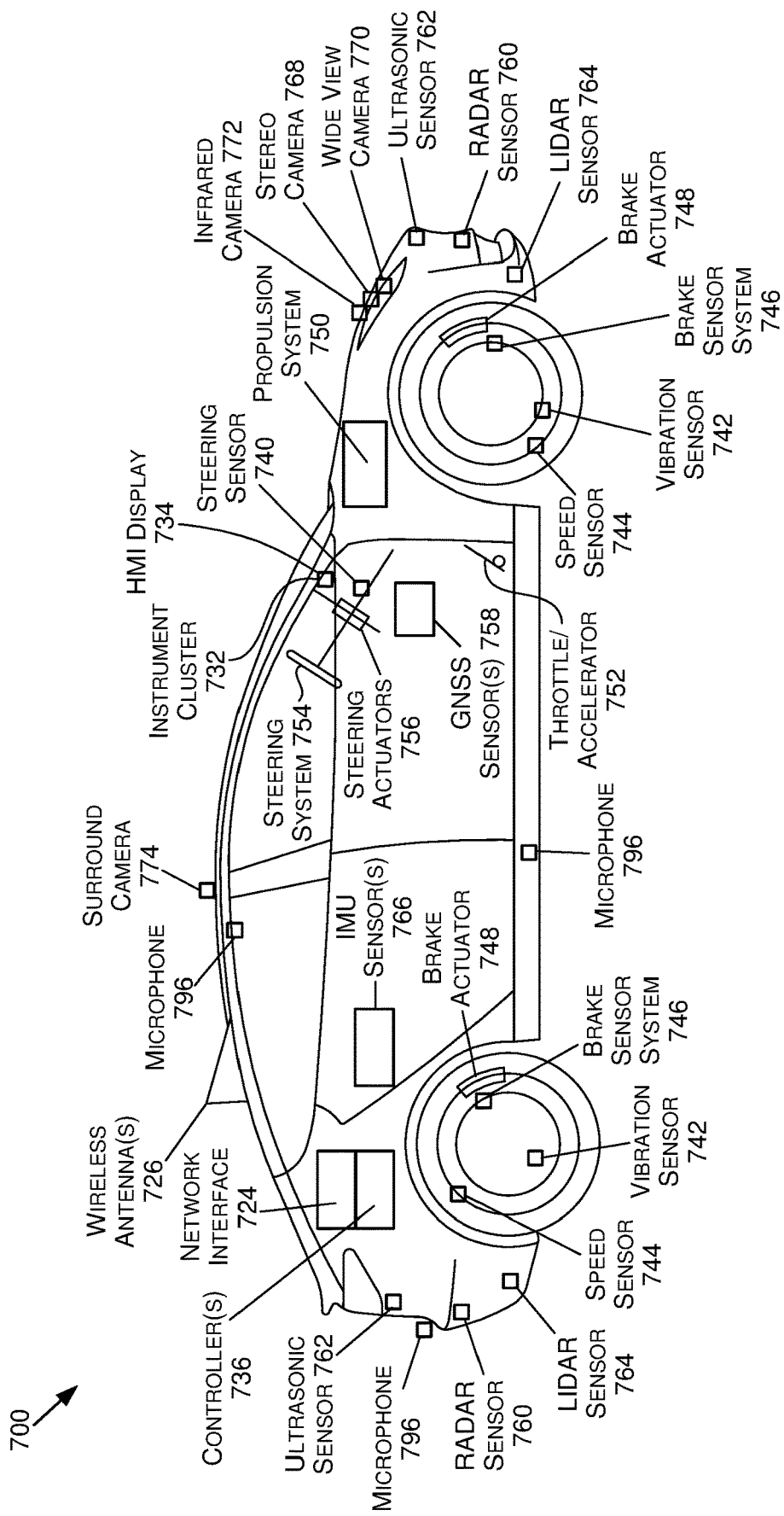
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. For example, the vehicle 700 may be capable of conditional automation (Level 3), high automation (Level 4), and/or full automation (Level 5), depending on the embodiment.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
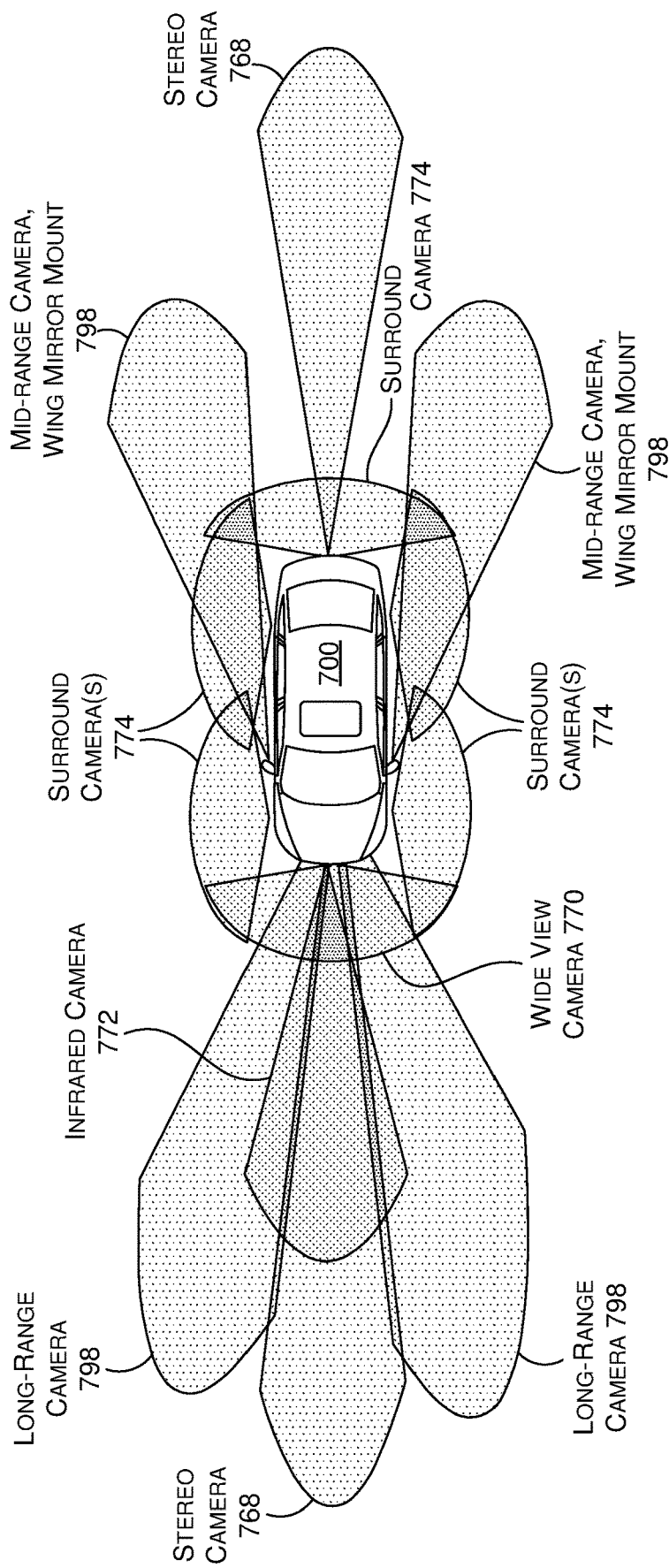
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
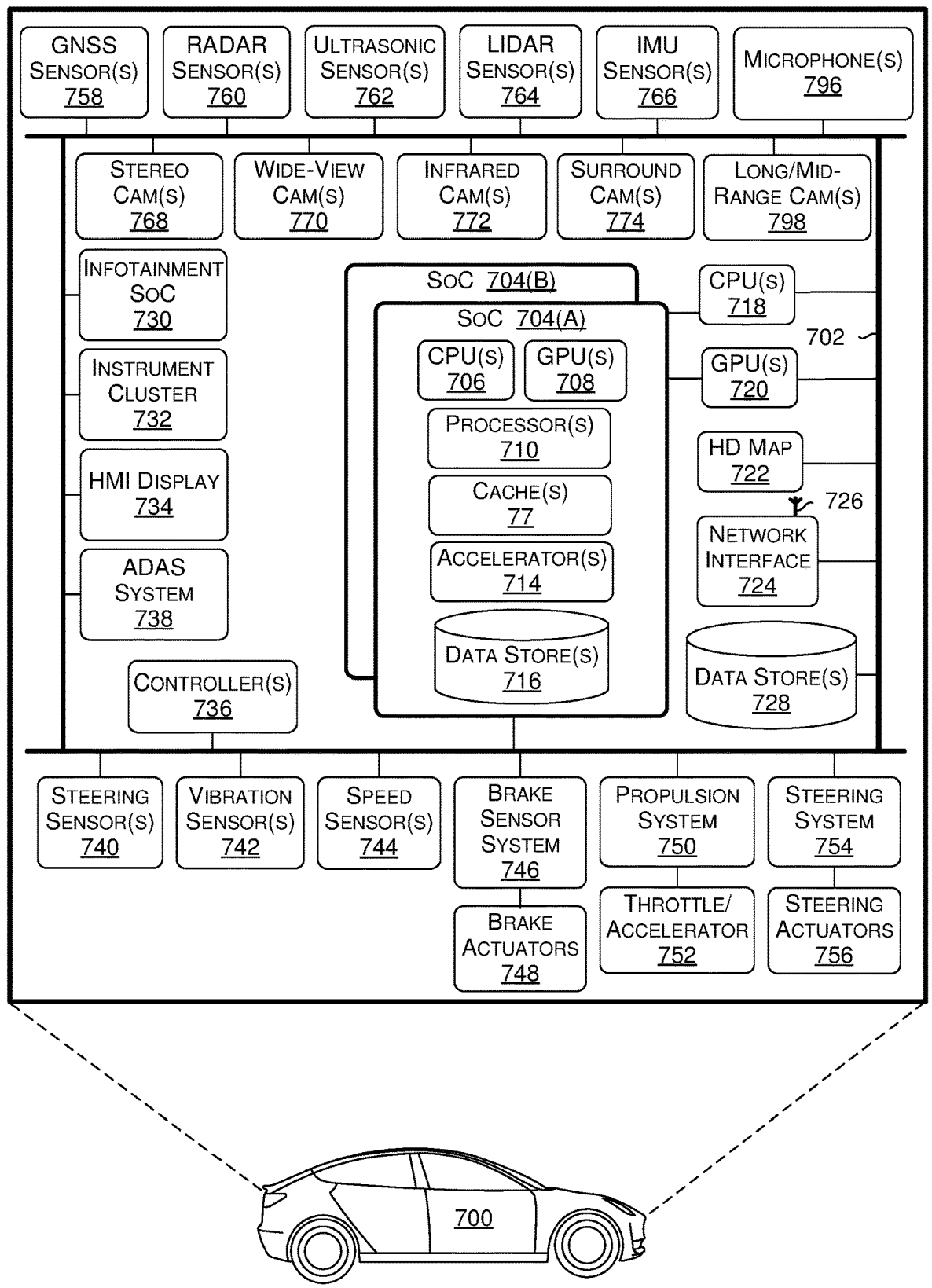
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3-D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3-D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3-D flash LIDAR, may also be used. 3-D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3-D flash LIDAR systems include a solid-state 3-D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3-D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
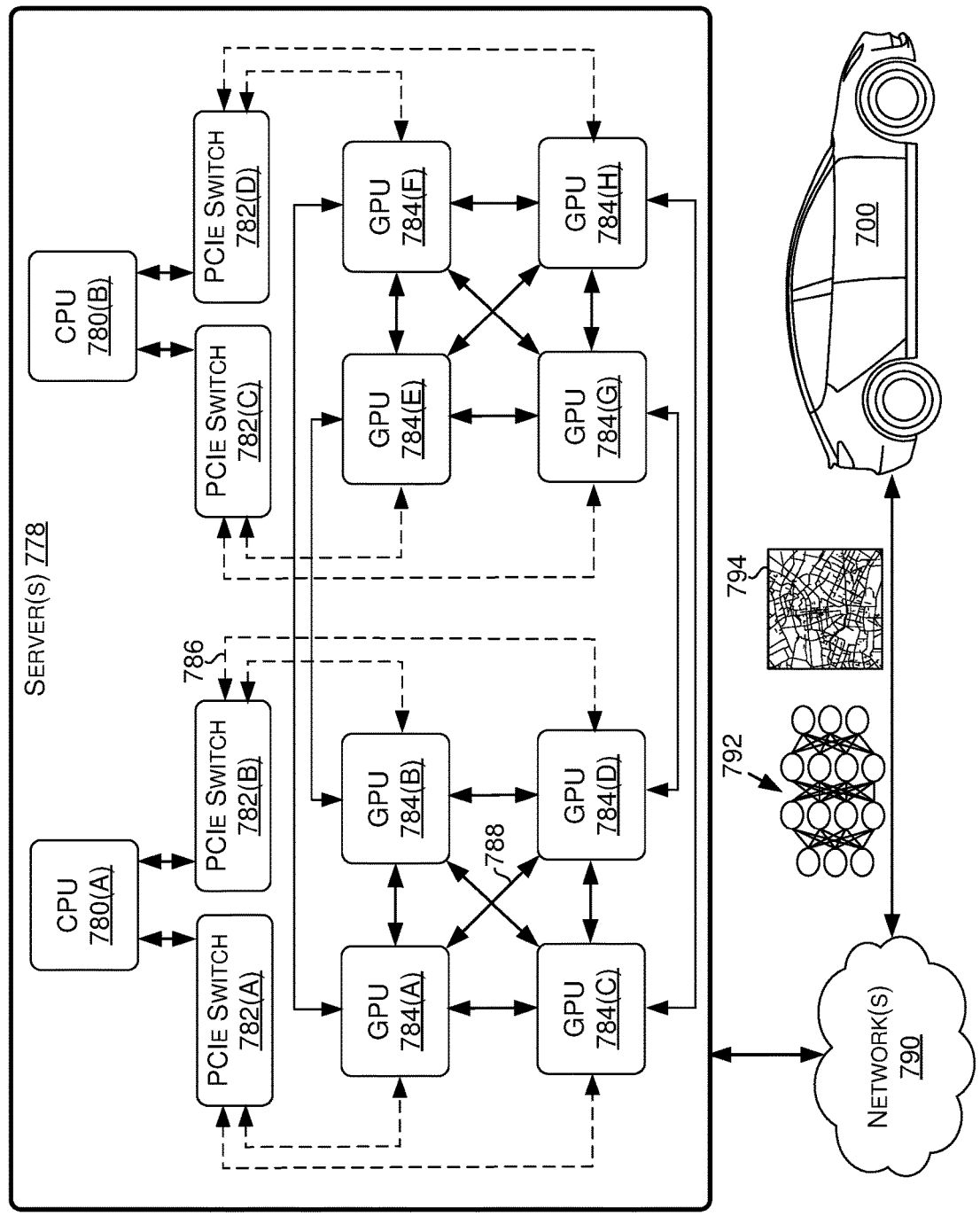
FIG. 7D is a system diagram for communication between cloud-based server(s) and the example autonomous vehicle of FIG. 7A, in accordance with some embodiments of the present disclosure

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
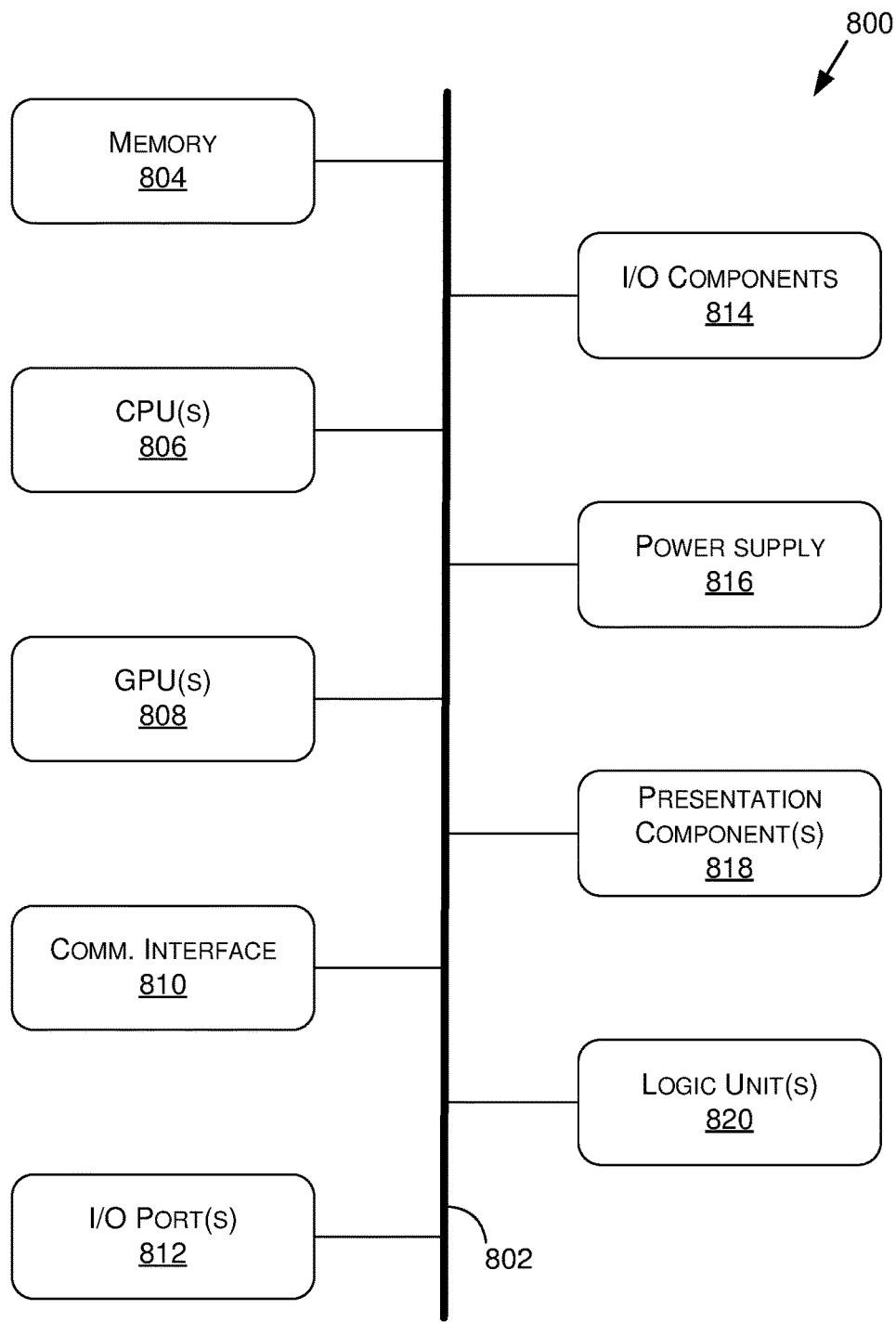
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3-D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

Example Data Center

Figure 9:
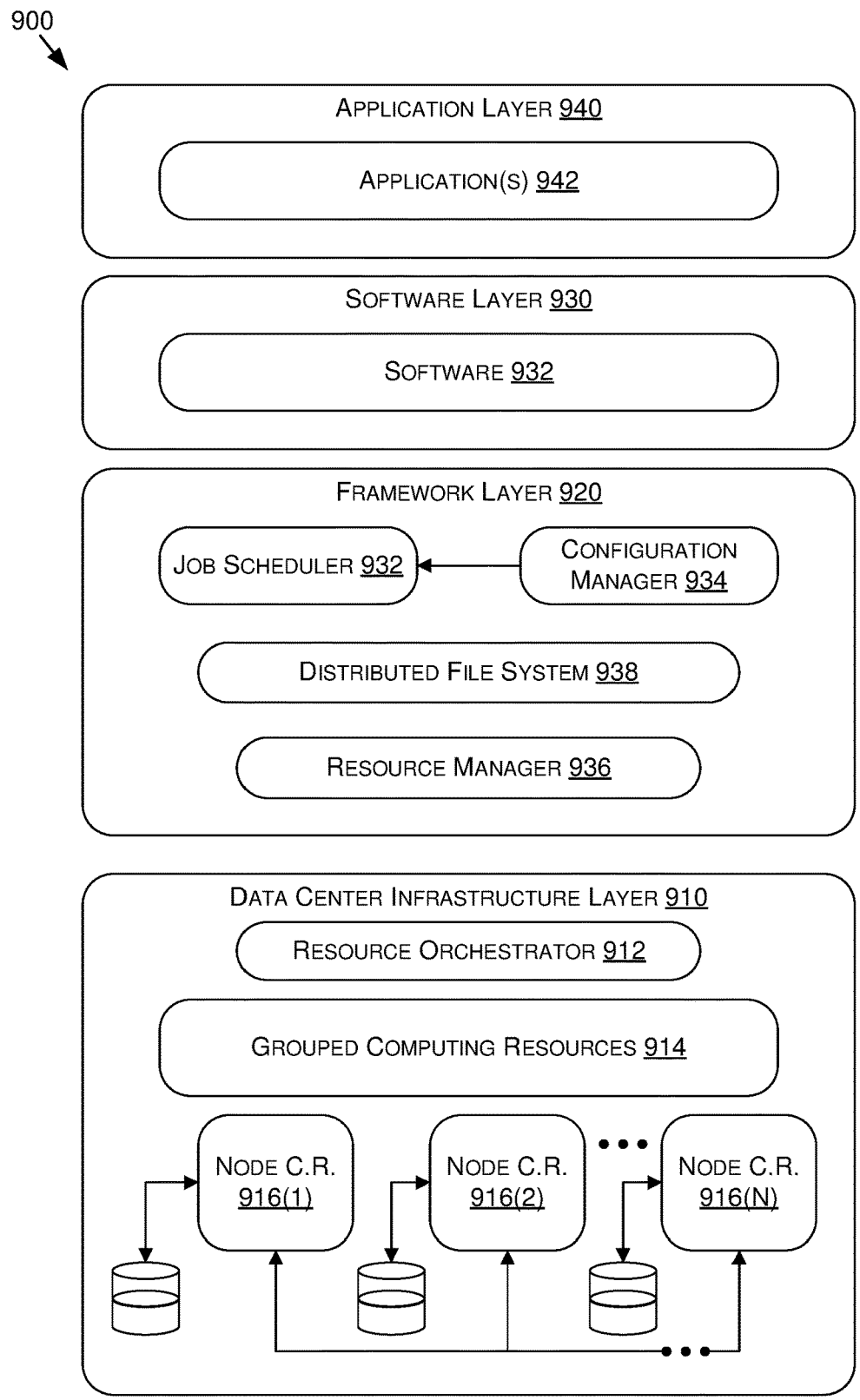
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, and/or other processors may be grouped within one or more racks to provide compute resources to support one or more workloads. The one or more racks may also include any number of power modules, cooling modules, and/or network switches, in any combination.

The resource orchestrator 922 may configure or otherwise control one or more node C.R.s 916(1)-916(N) and/or grouped computing resources 914. In at least one embodiment, resource orchestrator 922 may include a software design infrastructure ("SDI") management entity for the data center 900. The resource orchestrator 922 may include hardware, software, or some combination thereof.

In at least one embodiment, as shown in FIG. 9, framework layer 920 may include a job scheduler 932, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. The resource manager 1036 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   selecting, based at least on surround scene data associated with a set of features of a deployment environment, data comprising at least one of training data or one or more components for an eye tracking model, the surround scene data representing at least one category of data retrieved during surround scene data collection using a plurality of sensors;
   updating, using the selected data, at least a portion of the eye tracking model as an adapted eye tracking model customized to the deployment environment; and
   causing the adapted eye tracking model to be deployed in the deployment environment.

2. The method of claim 1, wherein the set of features corresponds to one or more of a face, an eye, a glare mask, a pupil mask, an eyes stripe, two-dimensional landmarks, three-dimensional landmarks, a face mask, a head pose, or an eye-gaze.

3. The method of claim 1, wherein the selected data comprises the training data that corresponds to a category of data from each of one or more bench setups and one or more in-vehicle setups.

4. The method of claim 1, wherein the selected data comprises the training data that corresponds to one or more of the set of features of the deployment environment.

5. The method of claim 1, wherein the eye tracking model comprises a first variant model of a plurality of eye tracking variant models, the plurality of eye tracking variant models generated based at least on:
   generating normalized gaze data based at least on aligning an axis of gaze data from a camera to a face or eye depicted in the gaze data; and
   determining tagged gaze features of the normalized gaze data, wherein the tagged gaze feature correspond to one or more of a gaze vector or a point of regard in a corresponding camera space; and
   training the first variant model of the plurality of eye tracking variant models using a first subset of the tagged gaze features and a second variant model of the plurality of eye tracking variant models using a second subset of the tagged gaze features.

6. The method of claim 1, wherein the eye tracking model comprises a subset of eye tracking variant models of the data, and the selecting comprises selecting the subset from the eye tracking variant models based at least on facial landmark neural network metrics that correspond to the set of features of the deployment environment.

7. The method of claim 1, wherein the set of features of the deployment environment comprises one or more of a set of spatial configuration features, a set of DNN-preference configuration features, or a set of gaze type configuration features.

8. The method of claim 1, wherein the selected data comprises the training data, the set of features comprises an indicia of a gaze angle range associated with the deployment environment, and the selecting is based at least on identifying one or more portions of the training data corresponding to the gaze angle range.

9. The method of claim 1, wherein the adapted eye tracking model comprises a first adapted eye tracking model, the method further comprising:
   receiving feedback data for the adapted eye tracking model, the feedback data corresponding to the deployment environment;
   generating a second adapted eye tracking model based at least on retraining the first adapted eye tracking model using the feedback data; and
   causing the second adapted eye tracking model to be deployed in the deployment environment.

10. The method of claim 1, wherein the eye tracking model comprises a first eye tracking model, the selected data comprises a first subset of data from a set of data, and the method further comprises:
    selecting a second subset of the set of data that corresponds to a second deployment environment;
    generating, using the second subset, a second adapted eye tracking model that is adapted to the second deployment environment based at least on retraining one or more portions of a second eye tracking model; and
    causing the second adapted eye tracking model to be deployed in the second deployment environment.

11. The method of claim 10, wherein the deployment environment is associated with a first vehicle type and the second deployment environment is associated with a second vehicle type.

12. A processor comprising:
    one or more circuits to identify data corresponding to a set of features of a deployment environment and comprising at least one of training data or one or more components for an eye tracking model that includes a subset of a plurality of eye tracking variant models, update at least a portion of the eye tracking model as an adapted eye tracking model customized to the deployment environment using the identified data, and cause the adapted eye tracking model to be deployed in the deployment environment.

13. The processor of claim 12, wherein the processor is comprised in at least one of:
    a control system for an autonomous or semi-autonomous machine;
    a perception system for an autonomous or semi-autonomous machine;
    a system for performing simulation operations;

a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

14. The processor of claim 12, wherein the identifying of the data is based at least on a gaze angle range associated with the deployment environment.

15. The processor of claim 12, wherein the plurality of eye tracking variant models is based at least on the set of features of the deployment environment.

16. The processor of claim 12, wherein the adapted eye tracking model comprises a first adapted eye tracking model, and the one or more circuits are further to:
receive feedback data for the first adapted eye tracking model, the feedback data corresponding to the deployment environment;
generate a second adapted eye tracking model based at least on retraining the first adapted eye tracking model using the feedback data; and
cause the second adapted eye tracking model to be deployed in the deployment environment.

17. A system comprising:
one or more processing devices to perform operations comprising:
providing data that corresponds to a set of features provided from an in-vehicle setup associated with a deployment environment;
receiving an adapted eye tracking model that is determined based at least on selecting, based at least on the set of features of the deployment environment, a subset of the data comprising at least one of training data or one or more components for an eye tracking model, and updating, using the subset of data, at least a portion of the eye tracking model as an adapted eye tracking model customized to the deployment environment; and
causing the adapted eye tracking model to be deployed in the deployment environment.

18. The system of claim 17, wherein the set of features corresponds to one or more of a face, an eye, a glare mask, a pupil mask, an eyes stripe, two-dimensional landmarks, three-dimensional landmarks, a face mask, a head pose, or an eye-gaze.

19. The system of claim 17, wherein the first data is provided from a bench setup that is associated with the deployment environment.

20. The system of claim 17, wherein the adapted eye tracking model comprises a first adapted eye tracking model, and the operations further comprise:
providing feedback data for the first adapted eye tracking model, the feedback data corresponding to the deployment environment;
receiving a second adapted eye tracking model that is generated based at least on retraining the first adapted eye tracking model using the feedback data; and
causing the second adapted eye tracking model to be deployed in the deployment environment.

* * * * *